US007512316B2

(12) United States Patent
Yoshigahara et al.

(10) Patent No.: US 7,512,316 B2
(45) Date of Patent: Mar. 31, 2009

(54) SIGNAL PROCESSOR, PROGRAM SIGNAL RECORDER, DISPLAY UNIT, TELEVISION SET, SIGNAL PROCESSING METHOD AND SIGNAL PROCESSING PROGRAM

(75) Inventors: Noriyuki Yoshigahara, Yokohama (JP); Nobuharu Ichihashi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/954,418

(22) Filed: Oct. 1, 2004

(65) Prior Publication Data

US 2005/0076366 A1 Apr. 7, 2005

(30) Foreign Application Priority Data

Oct. 2, 2003 (JP) ............................ 2003-344729
Sep. 27, 2004 (JP) ............................ 2004-280434

(51) Int. Cl.
*H04N 5/91* (2006.01)

(52) U.S. Cl. ........................................................ 386/68

(58) Field of Classification Search .................. 386/46, 386/83, 1, 68; 725/39
See application file for complete search history.

(56) References Cited

U.S. PATENT DOCUMENTS

| | | | | |
|---|---|---|---|---|
| 6,204,886 | B1 * | 3/2001 | Yoshimura et al. | 348/564 |
| 6,968,566 | B1 * | 11/2005 | Entwistle | 725/39 |
| 2004/0146280 | A1 | 7/2004 | Hasegawa et al. | |

FOREIGN PATENT DOCUMENTS

JP 2001-119671 4/2001

* cited by examiner

*Primary Examiner*—Thai Tran
*Assistant Examiner*—Tat Chi Chio
(74) *Attorney, Agent, or Firm*—Fitzpatrick, Cella, Harper & Scinto

(57) ABSTRACT

This application is a signal processor having a signal processing circuit for generating the data for displaying a program table in which a program being broadcasted or to be broadcasted and a selected program are arranged so that time axes become common and a configuration is disclosed in which the selected program is recorded so that it can be played in accordance with a playing designation performed by a user at an optional time.

4 Claims, 26 Drawing Sheets

FIG. 3B

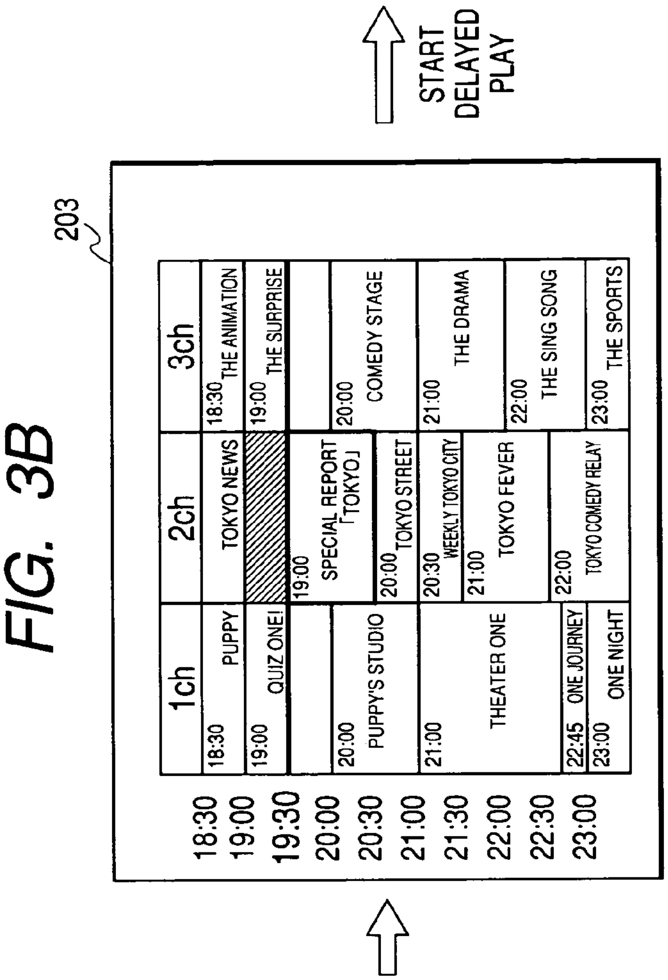

FIG. 3A

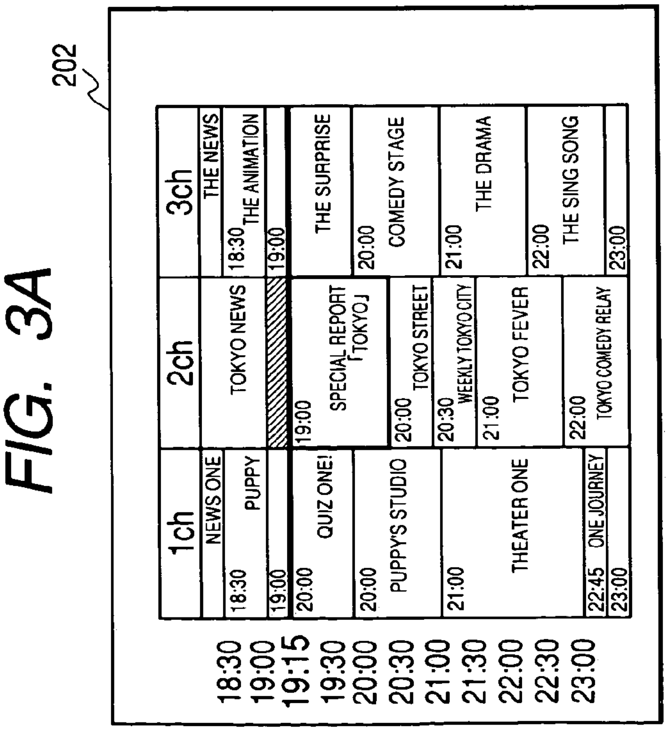

| | 1ch | 2ch | 3ch |
|---|---|---|---|
| 18:30 | NEWS ONE | TOKYO NEWS | THE NEWS |
| 19:00 | PUPPY | | 18:30 THE ANIMATION |
| 19:15 | QUIZ ONE! | ▨ | 19:00 |
| 20:00 | | 19:00 SPECIAL REPORT「TOKYO」 | THE SURPRISE |
| 20:00 | PUPPY'S STUDIO | 20:00 TOKYO STREET | 20:00 COMEDY STAGE |
| 20:30 | | 20:30 WEEKLY TOKYO CITY | |
| 21:00 | THEATER ONE | 21:00 TOKYO FEVER | 21:00 THE DRAMA |
| 22:00 | | 22:00 TOKYO COMEDY RELAY | 22:00 THE SING SONG |
| 22:45 | ONE JOURNEY | | |
| 23:00 | | | 23:00 |

202

| | 1ch | 2ch | 3ch |
|---|---|---|---|
| 18:30 | PUPPY | TOKYO NEWS | 18:30 THE ANIMATION |
| 19:00 | QUIZ ONE! | ▨ | 19:00 THE SURPRISE |
| 19:30 | | | |
| 20:00 | PUPPY'S STUDIO | 19:00 SPECIAL REPORT「TOKYO」 | 20:00 COMEDY STAGE |
| 20:30 | | 20:00 TOKYO STREET | |
| 21:00 | THEATER ONE | 20:30 WEEKLY TOKYO CITY | 21:00 THE DRAMA |
| 21:30 | | 21:00 TOKYO FEVER | |
| 22:00 | | 22:00 TOKYO COMEDY RELAY | 22:00 THE SING SONG |
| 22:30 | 22:45 ONE JOURNEY | | |
| 23:00 | ONE NIGHT | | 23:00 THE SPORTS |

203

START DELAYED PLAY

```
<bml>
  ⋮
    <script>
      function OPERATION FUNCTION(id){
        if(id="PLAY"){
          play(PROGRAM1.mpg)
        }
        else if(id="CANCEL"){
          launchDocument(STORED PROGRAM.bml)
    </script>
      ⋮
    <div>
        <TITLE>PROGRAM INFORMATION</TITLE>
    </div>
    <div>
        <INFORMATION>
            <INFORMATION TAG id="RECORD DATE">BLANK</INFORMATION TAG id="RECORD DATE">
            <INFORMATION TAG id="TIME">BLANK</INFORMATION TAG id="TIME">
            <INFORMATION TAG id="PROGRAM TITLE">BLANK</INFORMATION TAG id="PROGRAM TITLE">
            <INFORMATION TAG id="PROGRAM DETAILED CONTENTS">BLANK</INFORMATION TAG id="PROGRAM DETAILED CONTENTS">
        </INFORMATION>
    </div>
    <div>
        <OPERATION id="PLAY" onclick="OPERATION FUNCTION">PLAY</OPERATION id="REPRODUCE">
        <OPERATION id="CANCEL" onclick="OPERATION FUNCTION">CANCEL</OPERATION id="CANCEL">
    </div>
  ⋮
</bml>
```

FIG. 15

```
<bml>
  :
    <script>
      function PROGRAM SELECTION FUNCTION(id){
        if(id="1"){
          blowser.launchDocument(PROGRAM1.bml)
        }
        else if(id="2"){
          blowser.launchDocument(PROGRAM2.bml)
        }
          :
        else if(id="5"){
          blowser.launchDocument(PROGRAM5.bml)
        }
    </script>
      :
    <div>
      <TITLE>SELECT PROGRAM</TITLE>
    </div>
    <div>
      <ITEM>
          <ITEM1>RECORD DATE</ITEM1>
          <ITEM2>TIME</ITEM2>
          <ITEM3>PROGRAM TITLE</ITEM3>
          <ITEM4>CONTENTS</ITEM4>
      </ITEM>
      <PROGRAM id="1" onclick="PROGRAM SELECTION FUNCTION">
          <ITEM1>BLANK</ITEM1>
 1501     <ITEM2>BLANK</ITEM2>   1502
          <ITEM3>BLANK</ITEM3>
          <ITEM4>BLANK</ITEM4>
      </PROGRAM id="1" >
      <PROGRAM id="2" onclick="PROGRAM SELECTION FUNCTION">
          <ITEM1>BLANK</ITEM1>
          <ITEM2>BLANK</ITEM2>
          <ITEM3>BLANK</ITEM3>
          <ITEM4>BLANK</ITEM4>
      </PROGRAM id="2" >
          :
      <PROGRAM id="5" onclick="PROGRAM SELECTION FUNCTION">
          <ITEM1>BLANK</ITEM1>
          <ITEM2>BLANK</ITEM2>
          <ITEM3>BLANK</ITEM3>
          <ITEM4>BLANK</ITEM4>
      </PROGRAM id="5" >
    <div>  :
  :
</bml>
```

| PLAY METHOD | REPRODUCIBLE SPEED |
| --- | --- |
| HIGH SPEED PLAY | 1≦P-TIMES PLAY SPEED<3 |
| DIGEST PLAY | 3≦P-TIMES PLAY SPEED |

SIGNAL PROCESSOR, PROGRAM SIGNAL RECORDER, DISPLAY UNIT, TELEVISION SET, SIGNAL PROCESSING METHOD AND SIGNAL PROCESSING PROGRAM

BACKGROUND OF THE INVENTION

1. Field of the Invention

The present invention relates to a signal processor, particularly to a signal processor for a program table.

2. Related Background Art

Various apparatuses for recording and playing digital broadcasting in this type of field have been proposed so far. Particularly, an apparatus for recording and playing digital broadcasting is noticed which has a follow-up playing function for receiving and storing digital broadcasting including the information on a conventional program table and follow-up-playing a purposed program currently broadcasted at a designated playing speed (for example, refer to Japanese Patent Application Laid-Open No. 2001-119671).

FIG. 22 is a block diagram showing a configuration of a conventional apparatus for recording and playing digital broadcasting.

A receiving controller 502 receives desired received data from a receiver 501 in accordance with receiving channel information and the data is directly put in a TS divider 505 in accordance with a designation from the controller 502 in the normal state, once stored in a received moving picture storage unit 504 at the time of a pause or follow-up playing, then put in the TS divider 505. The received data is divided into moving picture data and program information data by the TS divider 505, converted into desired data by a moving picture decoder 506 and a program table producer 507 and then synthesized by a display controller 508 and output from a monitor 509.

At the time of follow-up playing, the moving picture decoder 506 can execute decoding at a plurality of playing speeds and the playing speeds are changed in accordance with the playing speed designation information from a user. At the same time, the information on the follow-up playing residual time is synthesized by the decoded data sent to the display controller 508 and output according to the presently-broadcasted time from a broadcasting time driver 510 and the presently-played time of the data received from the program table producer 507 in a delay state calculator 511. Moreover, the information on the playing speed selected by the user is sent to the display controller 508, synthesized to the decoded data and output.

FIG. 23 is an illustration showing the input screen of the playing speed at the time of the above conventional follow-up playing. In this screen, the playing speed designated by a user is displayed and moreover, the difference time between playing time and presently broadcasting time is displayed.

FIG. 24 is a block diagram showing a configuration of the apparatus for recording and playing digital broadcasting disclosed in Japanese Patent Application Laid-Open No. 2001-119671, in which a component common to that in FIG. 22 is provided with the same symbol and its description is omitted.

In the case of this apparatus, the moving picture decoder 506 can execute decoding at a plurality of playing speeds, a playing speed is calculated by using the playing information on the presently broadcasted time from a broadcasting time deriver 510, the time for presently playing the data received from the program table producer 507 and the end time from a user sent through a controller 712 according to a playing speed deciding unit 711 and a playing speed is designated to the moving picture decoder 506. Moreover, the information on the residual time of follow-up playing from the playing speed deciding unit 711 and the information on the user input waiting screen such as end time designation from the controller 712 are sent to the display controller 508, synthesized to decoded data and output.

In the case of the apparatus disclosed in Japanese Patent Application Laid-Open No. 2001-119671, when a desired end time from a user is set by an input unit 514 at the time of follow-up playing, a playing method and a playing speed are decided in accordance with the table shown in FIG. 25 by using the expression of magnification P=(desired end time-playing time)/(desired end time-broadcasting time).

FIG. 26 a conceptual view showing a configuration of a conventional system for receiving digital broadcasting.

In this system, reference numeral 1 denotes an IRD (Integrated Receiver/Decoder) for receiving digital broadcasting and outputting received results of a plurality of programs and 2 denotes a monitor for monitoring the image and voice of the IRD. The IRD 1 and the monitor 2 are connected by a cable 3 for transmitting image and voice signals. Reference numeral 4 denotes a remote controller for sending an instruction to the IRD 1 and 5 denotes an antenna for receiving a digital telecasting signal of a satellite or ground wave.

FIG. 27 is a block diagram showing a configuration of the IRD 1 in FIG. 26. For a user to audiovisually get digital broadcasting of a satellite, CATV, or ground wave, it is firstly necessary to set a frequency and TSID in which a CPU 1204 corresponds to a channel (service ID) designated through an operation unit 1208 to a broadcasting receiver 1201 by using the remote controller 4 and thereby, a signal received by the antenna 5 is converted into TS data. The TS data is divided into image data, voice data, data broadcasting data, and other data by a demultiplexer 1211. The image data is sent to the CPU 1204 through an MPEG2 video decoder 1212, the voice data is sent to the CPU 1204 through a MPEG2 audio decoder 1213, the data broadcasting data is sent to the CPU 1204 through a data broadcasting decoder 1214 and other data is sent to the CPU 1204 through a memory 1203.

In the case of enciphered TS data, a deciphering key and deciphering program are necessary for decoding. The MPEG2 video decoder 1212 decodes a video signal compressed by a MPEG2 method and sends the decoded video signal to a display data producing unit 1206 through the memory 1203. The decoded result is converted into a display signal by the display data producing unit 1206 and output to the monitor 2 connected by the cable 3.

The MPEG2 audio decoder 1213 decodes an audio signal compressed by the MPEG2 method and sends the decoded signal to a D/A converter 1207. The decoded result is D/A-converted by the D/A converter 1207 to become a left-channel signal and a right-channel signal and the signals are output to the monitor 2.

The data broadcasting decoder 1214 decodes a file described by a mark-up language such as BML and moreover makes a corresponding decoder decode a contents file of image and voice used in the file described by the mark-up language and sends the file to the display data generator producing unit 1206 through the memory 1203. The decoded result is converted into a display signal by the display data producing unit 1206, sent to the D/A converter 1207 to become a left-channel signal and a right-channel signal and the signals are output to the monitor 2.

To audiovisually get a recorded program to be audiovisually got by storing received broadcasting data and playing the stored broadcasting data, TS data output from the broadcasting receiver 1201 is stored in a TS storage unit 1209.

To play the stored TS data, the DTV module 1202 is designated to output the TS data from the TS storage unit 1209. The stored TS data is controlled by a control program in the CPU 1204 and the TS data selected and designated through the operation unit 1208 is played by each decoder of the DTV module 1202 as a TS data file by using the remote controller 4 or the like. Moreover, a program is recorded and deleted also by the control program and the TS data selected and designated through the operation unit 1208 is process as a TS data file by using the remote controller 4 or the like.

SUMMARY OF THE INVENTION

It is an object of the present invention to realize a program table capable of recognizing a recorded program together with a program presently broadcasted or to be broadcasted.

The following problems can be listed as specific programs considered in the following embodiments.

(1) In the case of the above-described recording playing apparatus in FIG. 22, a program table during a pause or while follow-up-played has a problem that it is not only an old program table but also the table on which a delay state is not reflected, and comfortable reading cannot made.

(2) In Japanese Patent Application Laid-Open No. 2001-119671, there is a problem that when a playing schedule for follow-up playing is designated, a specific designation by a numerical value is necessary after setting a minute schedule considering the broadcasting time and end time of other program and a scheduled result is not reflected on a program table and thereby a comfortable playing schedule operation cannot be performed.

(3) In the case of the above-described recording and playing apparatus in FIG. 27, display of the program information on and program list of programs stored in the TS storage unit 1209 and display of a selected screen are performed by using an exclusive application. Therefore, it is difficult to change even a display configuration or display content unsuitable for the usability of a user. Moreover, even if it is possible to change the display configuration or display content in accordance with the usability of the user, there is a problem that a system becomes complex because a more exclusive application becomes necessary.

One of inventions of this application is constituted as described below.

That is, a signal processor has a signal processing circuit for generating the data for displaying a program table in which a program presently broadcasted or to be broadcasted and a selected program are arranged so that time axes becomes common and the selected program is a program recorded so that it can be played in accordance with a playing designation performed by a user at optional time.

It is also allowed to constitute the signal processing circuit as a circuit not using a program or use a circuit constituted so as to perform a predetermined processing by executing a program.

Particularly, for this configuration, it is possible to preferably use a configuration in which the program table is a program table for displaying the broadcasting time of a program presently broadcasted or to be broadcasted and the playing time so that time axes become common.

Moreover, for this configuration, it is possible to use a configuration in which the playing time is a playing time selected from playing times different from each other.

Furthermore, the invention of a program recording and playing apparatus of this application is constituted by a recording device for recording a program so that the program can be played in accordance with a playing designation performed by a user at optional time and the previously-described signal processor. Particularly, in this case, it is possible to preferably use a configuration having a tuner for selecting a program being broadcasted. The recording device can use a hard disk drive, optical disk drive, magnetic disk drive, or semiconductor memory.

Furthermore, the invention of a display unit of this application is constituted by the previously-described signal processor and a display device for displaying the program table. The display device can use a flat display such as a plasma display panel, liquid-crystal display panel, field emission display panel or electroluminescence panel or CRT.

Furthermore, the invention of a television set of this application is constituted by the previously-described signal processor, a tuner for selecting a program being broadcasted, and a display device for displaying the program table and the program.

Furthermore, the invention of a signal processing method of this application comprises a step of generating data for displaying a program table in which a program presently broadcasted or to be broadcasted and a selected program are arranged so that time axes become common and a step of outputting the data, in which the selected program is a program recorded so that it can be played in accordance with a playing designation performed by a user at optional time.

Furthermore, a signal processing program of this application is constituted so as to be able to execute a step of generating data for displaying a program table in which a program being broadcasted or to be broadcasted and a selected program are arranged so that time axes become common and a step of outputting the data.

Embodiments of this application use the following configurations as apparatuses for recording and playing digital broadcasting using the above inventions.

One of them is an apparatus for recording and playing digital broadcasting having storing means for storing the data being digital-broadcasted and decoding means for decoding the data stored in the storing means at a plurality of playing speeds to follow-up-playing a purposed program being broadcasted at a designated playing speed, comprising program data extracting means for extracting program data from the data being digital-broadcasted, program-table generating means for generating a program table in accordance with the extracted program data, playing-time/program-information deriving means for deriving the playing time of and program information on a purposed program from the data stored in the storing means, delay state calculating means for calculating the delay state of a program to be follow-up-played in accordance with the broadcasting time information derived from the program table generated by the program table generating means and the playing time information derived from the playing-time/program-information deriving means and program table processing means for processing the program table derived from the program generating means in accordance with the delay state calculated by the delay state calculating means and the program information derived from the playing-time/program-information deriving means.

In the case of an apparatus for recording and playing digital broadcasting having storing means for storing the data presently digital-broadcasted and decoding means for making it possible to decode the data stored in the storing means at a plurality of playing speeds to follow-up play a purposed program being broadcasted at a designated playing speed, a configuration is also disclosed which includes program data extracting means for extracting program data from the data being digital-broadcasted, program table generating means for generating a program table in accordance with the extracted program data, playing-time/program-information deriving means for deriving the playing time of and program information on a purposed program from the data stored in the storing means, playing schedule calculating means for calculating the playing schedule information on a purposed program to be follow-up-played in accordance with the broadcasting time information derived from the program table generated by the program table generating means and the playing time information derived from the playing-time/program-information deriving means and program table processing means for processing the program table derived from the program table generating means in accordance with the playing schedule information calculated by the playing schedule calculating means and program information derived from the playing-time/program-information deriving means.

Moreover, in the case of an apparatus for recording and playing digital broadcasting for storing digital broadcasting data in storing means to play the data, a configuration is also disclosed which is provided with mark-up language editing means for relating the program information which is the information on programs stored in the storing means with broadcasting data for programs stored in the storing means in accordance with a mark-up language format and putting the information in writing and display screen data generating means for generating program information display screen data and program selection display screen data in accordance with a program file put in writing by the mark-up language editing means.

Furthermore, in the case of a control method of an apparatus for recording and playing digital broadcasting for storing the data being digital-broadcasted in storing means and follow-up-playing a purposed program being broadcasted at a designated playing speed, a control method is also disclosed which successively executes a program table generating step of generating a program table in accordance with the program data extracted from the data being digital-broadcasted, playing-time/program-information deriving step of deriving the playing time of and program information on a purposed program from the data stored in the storing means, a delay state calculating step of calculating the delay state of a program to be follow-up-played in accordance with the broadcasting time information derived from the program table generated in the program table generating step and the playing time information derived in the playing-time/program-information deriving step and a program table processing step of processing the program table derived in the program table generating step in accordance with the delay state calculated in the delay state calculating step and the program information derived in the playing-time/program-information deriving step.

Furthermore, in the case of a control method of an apparatus for recording and playing digital broadcasting for storing the data being digital-broadcasted in storing means and follow-up-playing a purposed program being broadcasted at a designated playing speed, a control method is also disclosed which successively executes a program table generating step of generating a program table in accordance with the program data extracted from the data being digital-broadcasted, a playing-time/program-information deriving step of deriving the playing time of and program information on a purposed program from the data stored in the storing means, a playing schedule calculating step of calculating the playing schedule information on a program to be follow-up-played in accordance with the broadcasting time information derived from the program table generated in the program table generating step and the playing time information derived in the playing-time/program-information deriving step, and a program table processing step of processing the program table derived in the program table generating step in accordance with he playing schedule information calculated in the playing schedule calculating step and the program information derived in the playing-time/program-information deriving step.

In the case of a control method of an apparatus for recording and playing digital broadcasting for storing digital broadcasting data in storing means and playing the data, a control method is also disclosed which relates program information which is the information on programs stored in the storing means with broadcasting data for programs stored in the storing means in accordance with a mark-up language format and puts the information in writing, generates display screen data for program information and program selection display screen data in accordance with the program file put in writing and displays the generated program-information display screen data or program selection display screen data on display means.

In the case of a control program for executing a control method of an apparatus for recording and playing digital broadcasting for follow-up-playing a purposed program being broadcasted at a designated playing speed, a program is also disclosed which is able to execute a program table generating step of generating a program table in accordance with the program data extracted from the data being digital-broadcasted, a playing-time/program-information deriving step of deriving the playing time of and program information on a purposed program from the data stored in the storing means, a delay state calculating step of calculating the delay state of a program to be follow-up-played in accordance with the broadcasting time information derived from the program table generated in the playing-time/program-information deriving step and the playing time information derived in the playing-time/program-information deriving step and a program table processing step of processing the program table derived in the program table generating step in accordance with the delay state calculated in the delay state calculating step and the program information derived in the playing-time/program-information deriving step.

In the case of a control program for executing a control method of an apparatus for recording and playing digital broadcasting for storing the data being digital-broadcasted in storing means and follow-up-playing a purposed program being broadcasted at a designated playing speed, a program is also disclosed which is able to execute a program table generating step of generating a program table in accordance with the program data extracted from the data being digital-broadcasted, a playing-time/program-information deriving step of deriving the playing time of and program information on a purposed program from the data stored in the storing means, a playing schedule calculating step of calculating the playing schedule information on a program to be follow-up-played in accordance with the broadcasting information derived from the program table generated in the program table generating step and the playing time information derived in the playing-time/program-information deriving step and a program table processing step of processing the program table derived in the program table generating step in accordance with the playing schedule information calculated in the playing schedule calculating step and the program information derived in the playing-time/program-information deriving step.

In the case of a control program for executing a control method of an apparatus for recording and playing digital broadcasting for storing digital broadcasting data in storing means to play the data, a program is also disclosed which is able to execute a step of relating the program information which is the information on programs stored in the storing means with the broadcasting data for programs stored in the storing means in accordance with a mark-up language format and putting them in writing, a step of generating program information display screen data and program selection display screen data in accordance with the program file put in writing and a step of displaying the generated program information display screen data or program selection display screen data on display means.

BRIEF DESCRIPTION OF THE DRAWINGS

FIGS. 3A and 3B are illustrations showing the display operation of a delay state at the time of follow-up playing in the first embodiment;

FIG. 14 is an illustration showing a BML file example of program information display screen data;

FIG. 15 is an illustration showing a BML file example of program selection display screen data;

DESCRIPTION OF THE PREFERRED EMBODIMENTS

Embodiments of the present invention are described below by referring to the accompanying drawings.

First Embodiment

<Apparatus Configuration of First Embodiment>

Figure 1:
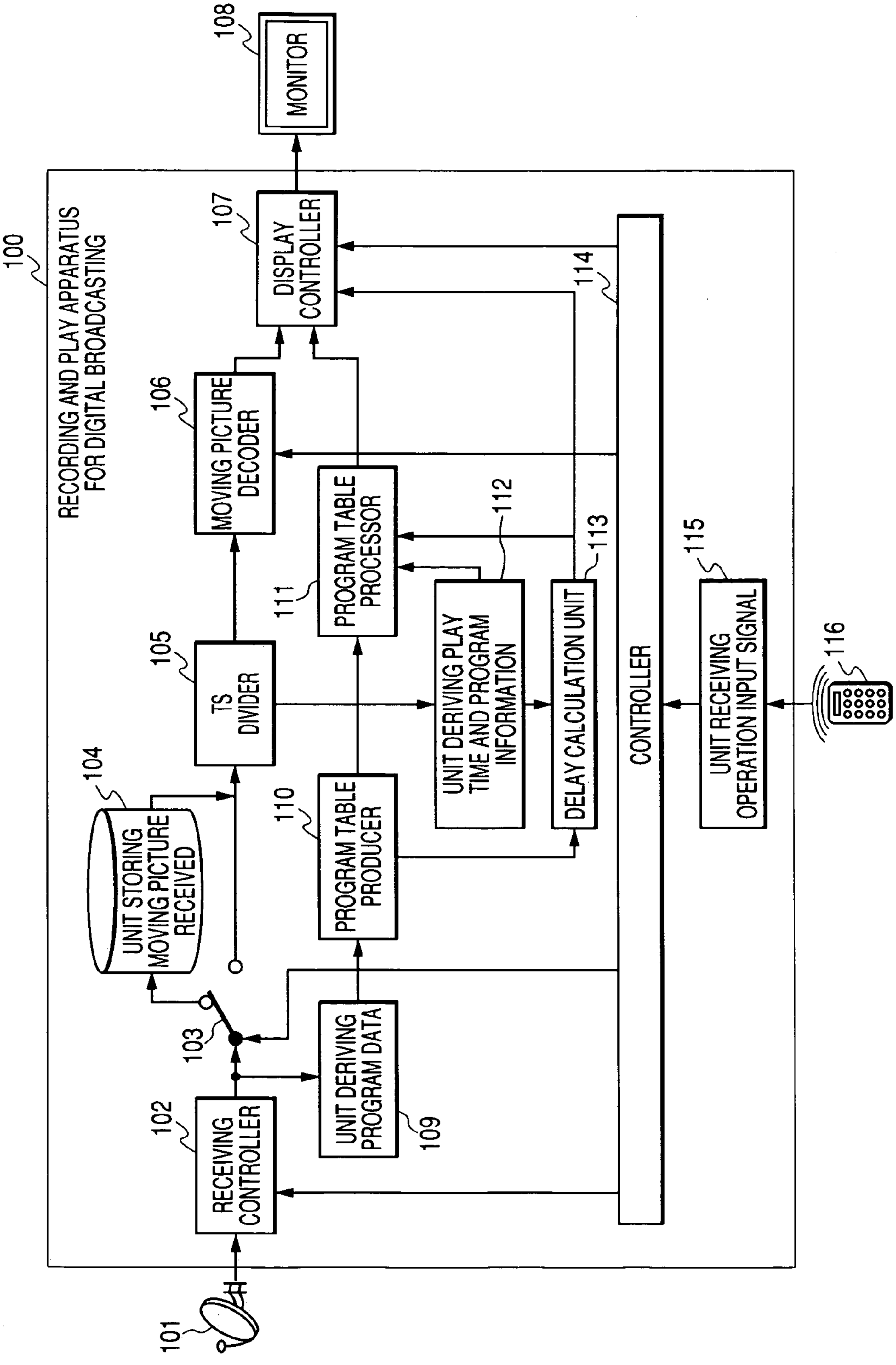
FIG. 1 is a block diagram showing a configuration of an apparatus for recording and playing digital broadcasting of first embodiment of the present invention.

FIG. 1 is a block diagram showing a configuration of the apparatus for recording and playing digital broadcasting of the first embodiment of the present invention. This configuration uses a configuration in which a signal processor for generating the data for displaying a program table peculiar to the present invention, a program signal reorder using the signal processor, and a television set are combined.

The apparatus for recording and playing digital broadcasting 100 receives operation information sent from an operation input unit (hereafter referred to as remote controller) 116 for a user to input a request by a unit receiving an operation input signal 115 and the controller 114 controls operations of the recording and playing apparatus.

A receiving controller 102 receives desired received data from a receiver 101 in accordance with the receiving channel information sent from the controller 114. The received data is normally directly output to a TS divider 105 by a switching unit 103. Moreover, to make it possible to perform playing at a desired time after recording data at the time of a pause or follow-up playing, the data is output to a unit storing moving picture 104 received so as to be once stored in the unit storing moving picture 104 received. The data read out from the unit storing moving picture received is output to the TS divider 105. Moving picture data is extracted from the received data by the TS divider 105 and the received data decoded by a moving picture decoder 106 is sent to a display controller 107.

Moreover, only program information is extracted from the received data output from the receiving controller 102 by a unit deriving program data 109. A program table of the received data presently being broadcasted is generated by a program table producer 110 by using the program information.

The moving picture decoder 106 can perform demodulation at a plurality of playing speeds at the time of follow-up playing and playing speeds are changed in accordance with the playing speed designation information from a user sent through the controller 114. A unit deriving playing time and program information 112 derives the playing time of and program information on a purposed program from the follow-up playing data stored in the unit storing moving picture received 104.

Moreover, in a delay calculation unit 113, the information on the residual time of follow-up playing is calculated in accordance with the present playing time derived from the unit deriving playing time and program information 112 and the present broadcasting time derived from the program table producer 110 and the calculated information is synthesized to the data sent to and decoded by the display controller 107 and output from a display unit 709. The information at a playing speed selected by a user is similarly synthesized to the data sent to, decoded and output by the display controller 107.

Furthermore, in a program table processor 111 serving as a signal processing circuit, program information is derived from the unit deriving playing time and program information 112 on all programs to be provided with a pause or to be follow-up-played, a delay time is derived from the delay calculation unit 113 and a layout is changed on the program table generated by the program table producer 110 so that a playing time becomes equal to the present broadcasting time. Thereby, when displaying the program table, the present broadcasting program table including a delay state is synthesized with moving picture data and output by the display controller 107. In this case, a case of performing follow-up playing is described. That is, a selected program is a program to be follow-up-played. However, to play a stored program, the present invention can be applied to the program independently of whether the program is a program to be follow-up-played.

<Display Operation of Delay State at the Time of Follow-Up Playing>

Then, the display operation of a delay state at the time of follow-up playing is described below by referring to FIGS. 2A, 2B, 3A, 3B, 4A and 4B.

Figure 2A:
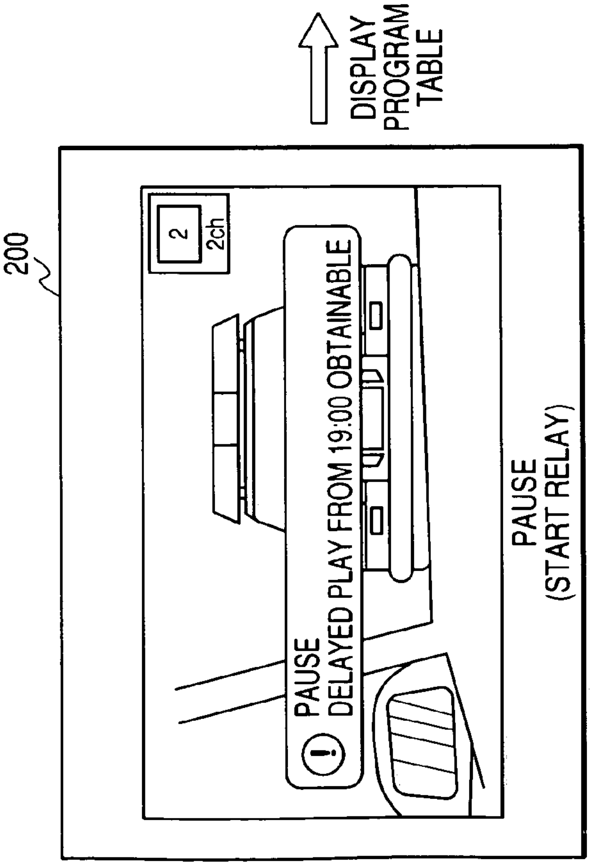
FIGS. 2A and 2B are illustrations showing the display operation of a delay state at the time of follow-up playing in the first embodiment.
Figure 2B:
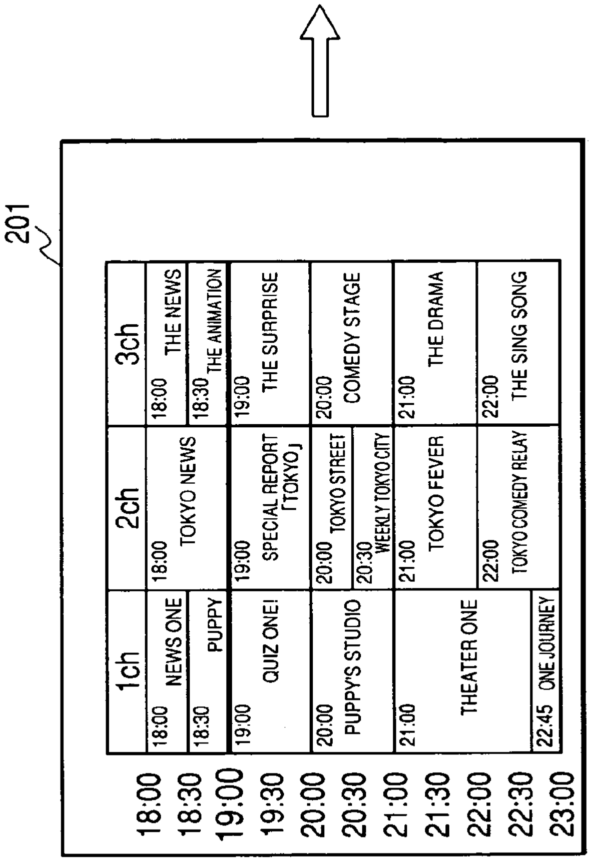

The state 200 in FIG. 2A shows a state of temporarily stopping two channels at the time of normal playing and the playing start time by the delay calculation unit 113. In this case, when designating display of a program table, the presently-broadcasted program table is displayed like the state 201 shown in FIG. 2B (the same is applied to the following).

Thereafter, the present state is changed to the state 202 shown in FIG. 3A and the state 203 shown in FIG. 3B with passage of time and a delay state is displayed together with the presently-broadcasted program table. That is, in the case of the program table in the state 202, 15 min passes for a pause state and the program of the channel 2 is shown in a state in which the program is delayed from the presently-broadcasted program by 15 min. In the case of the program table of the state 203, 15 min further passes for a pause state and the program of the channel 2 is shown in a state in which the program is delayed from the presently-broadcasted program by 30 min. That is, a program table is set in which programs being broadcasted and to be broadcasted and the selected program (program of the channel 2) are arranged so that time axes become common. Particularly, because the playing time of the selected program and broadcasting times of the programs being broadcasted and to be broadcasted are arranged so that time axes become common, it is possible to easily visually confirm the relation between the end time when playing the selected program and the broadcasting time of the program being broadcasted and/or to be broadcasted.

Figure 4B:
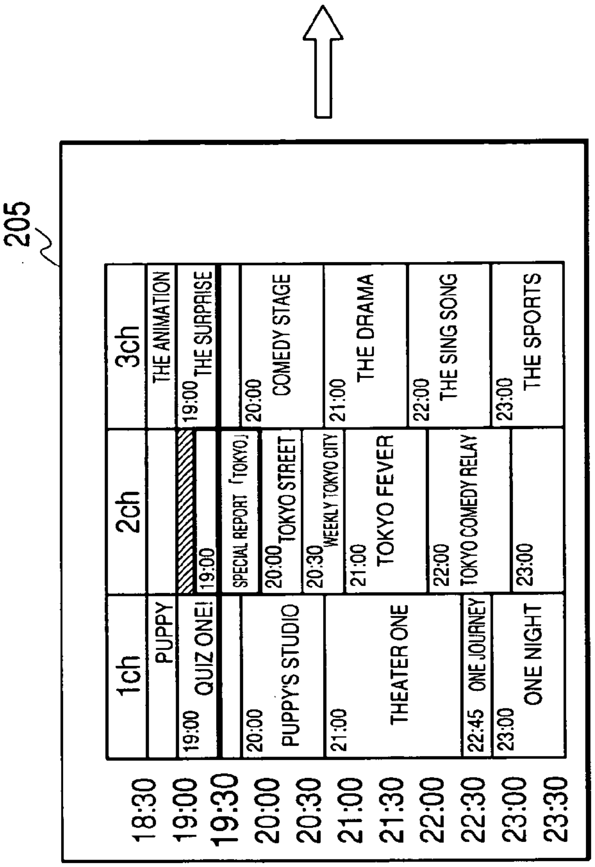
FIGS. 4A and 4B are illustrations showing the display operation of a delay state at the time of follow-up playing of second embodiment of the present invention.
Figure 4A:
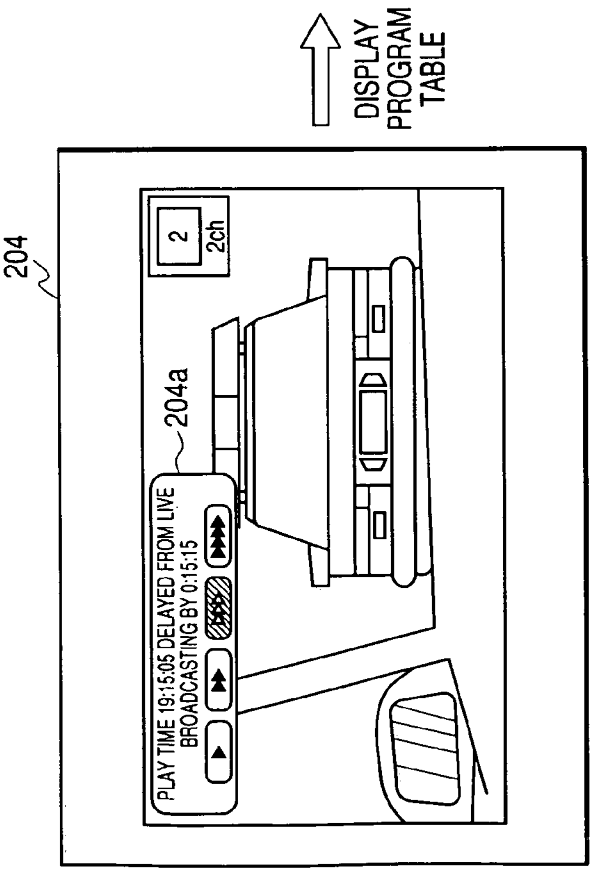

Thereafter, when the normal screen appears and a user designates restart and high-speed playing as a playing speed, the playing speed designated by the user is displayed (refer to 204*a* in FIG. 4A) like the state 204 shown in FIG. 4A and the difference time (15:05 shown in FIG. 4B) between the playing time (19:15:05 in FIG. 4A) and the presently broadcasting time is displayed. Thus, even if high-speed playing is designated, a delay state is displayed together with a program table presently broadcasted. That is, in the case of the state 205 in FIG. 4B, the program of the channel 2 is shown in a state in which the program is delayed from the presently-broadcasted program by the different time (0:15:05).

As described above, in the case of this embodiment, by displaying other program serving as an important factor for deciding request restriction of a user and a delay state at the same time as a program table, recognition of a delay state by and decision making of a request restriction of a user can be more easily performed. That is, a delay state is reflected on a program table being played and a comfortable reading is realized.

Second Embodiment

<Apparatus Configuration of Second Embodiment>

Figure 5:
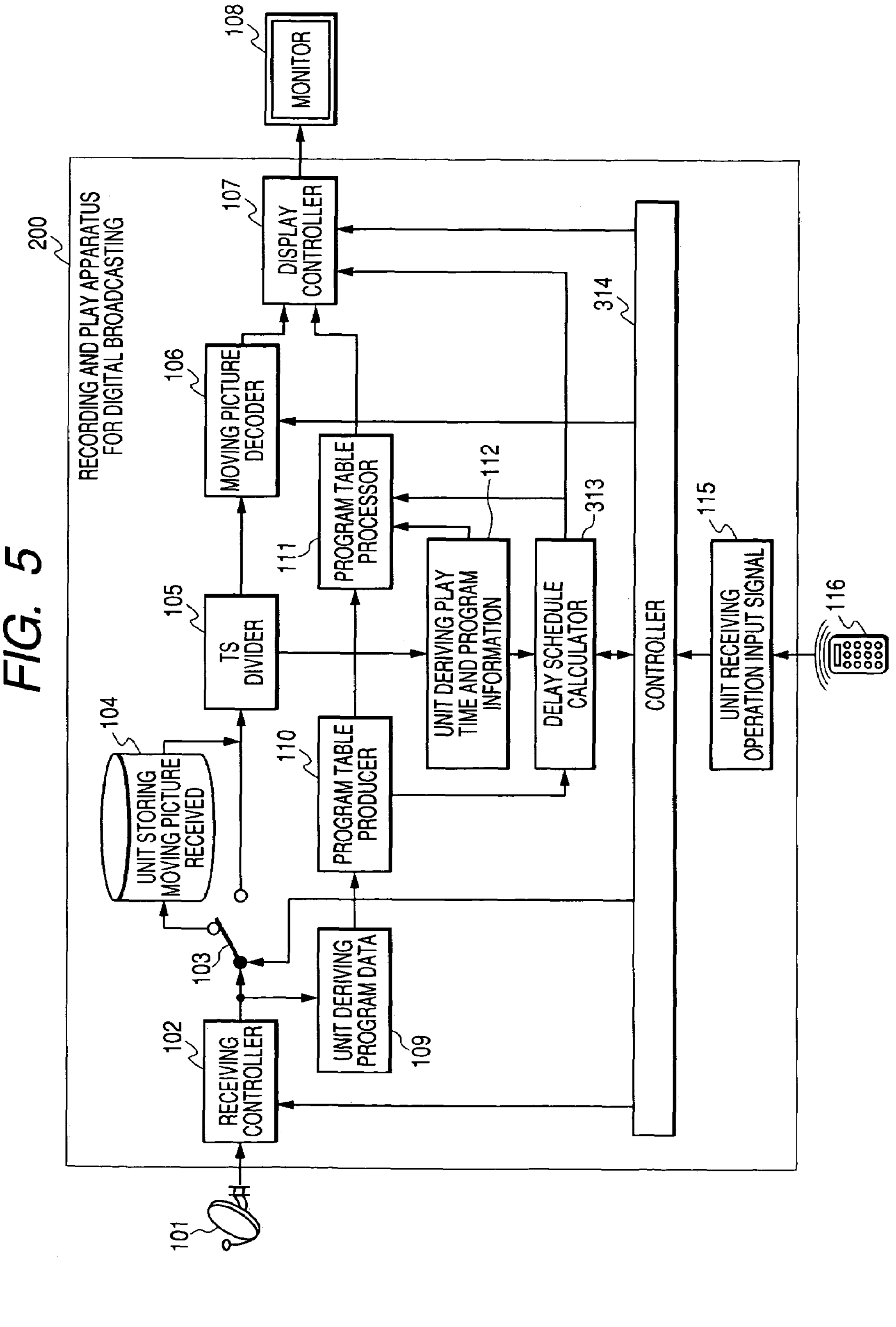
FIG. 5 is a block diagram showing a configuration of an apparatus for recording and playing digital broadcasting of the second embodiment of the present invention.

FIG. 5 is a block diagram showing a configuration of an apparatus for recording and playing digital broadcasting of second embodiment of the present invention, in which a component same as that in FIG. 1 is provided with the same symbol and its description is omitted.

In the case of the above first embodiment, the delay calculation unit 113 is used to reflect a delay state on a program table. However, this embodiment has a feature that the delay schedule calculator 313 is used instead of the delay calculation unit 113 in the configuration of FIG. 1.

The delay schedule calculator 313 has a function for calculating the playing schedule plan by receiving the information constituted by the identifier of a program and a playing speed or the identifier of the program and desired program end time as playing designation information from a controller 314 for a program to be paused or follow-up-played.

At the time of follow-up playing, the delay schedule calculator 313 calculates the information on the residual time of follow-up playing (that is, delay time) in accordance with the present playing time derived from the unit deriving playing time and program information 112 and the present broadcasting time of the data received from the program table producer 110. Moreover, the calculated information is sent to the display controller 107, synthesized to decoded data, and output from the monitor 108.

Furthermore, the playing speed, start time, follow-up-playing end time, and program end time on a designated program are calculated in accordance with the playing designation information constituted by the identifier and playing speed of a program selected by a user through the controller 314 or the identifier of the program and desired program end time and the calculated delay information and the identifier of the program, playing speed, and desired program end time are sent to the program table processor 111 together with the delay information on the program.

Then, in the program table processor 111, program information is derived from the unit deriving playing time and program information 112 on all programs to be paused or follow-up-played, the delay information, identifier of a program, playing speed and program end time are derived from the delay schedule calculator 313 and a layout is changed on the program table generated by the program table producer 110 so that the layout conforms to the calculated playing schedule. Thereby, when displaying the program table, the program table of the present broadcasting including a delay state and a playing schedule is synthesized with motion picture data by the display controller 107 and output.

Moreover, when a user decides a schedule, the information is all sent to the controller 314 and a playing speed is changed according to the schedule when the controller 314 applies a designation to the moving picture decoder 106 in accordance with the playing speed, start time and follow-up-playing end time of the follow-up playing communicated from the delay schedule calculator 313.

<Calculation Processing by Delay Schedule Calculator>

Figure 6:
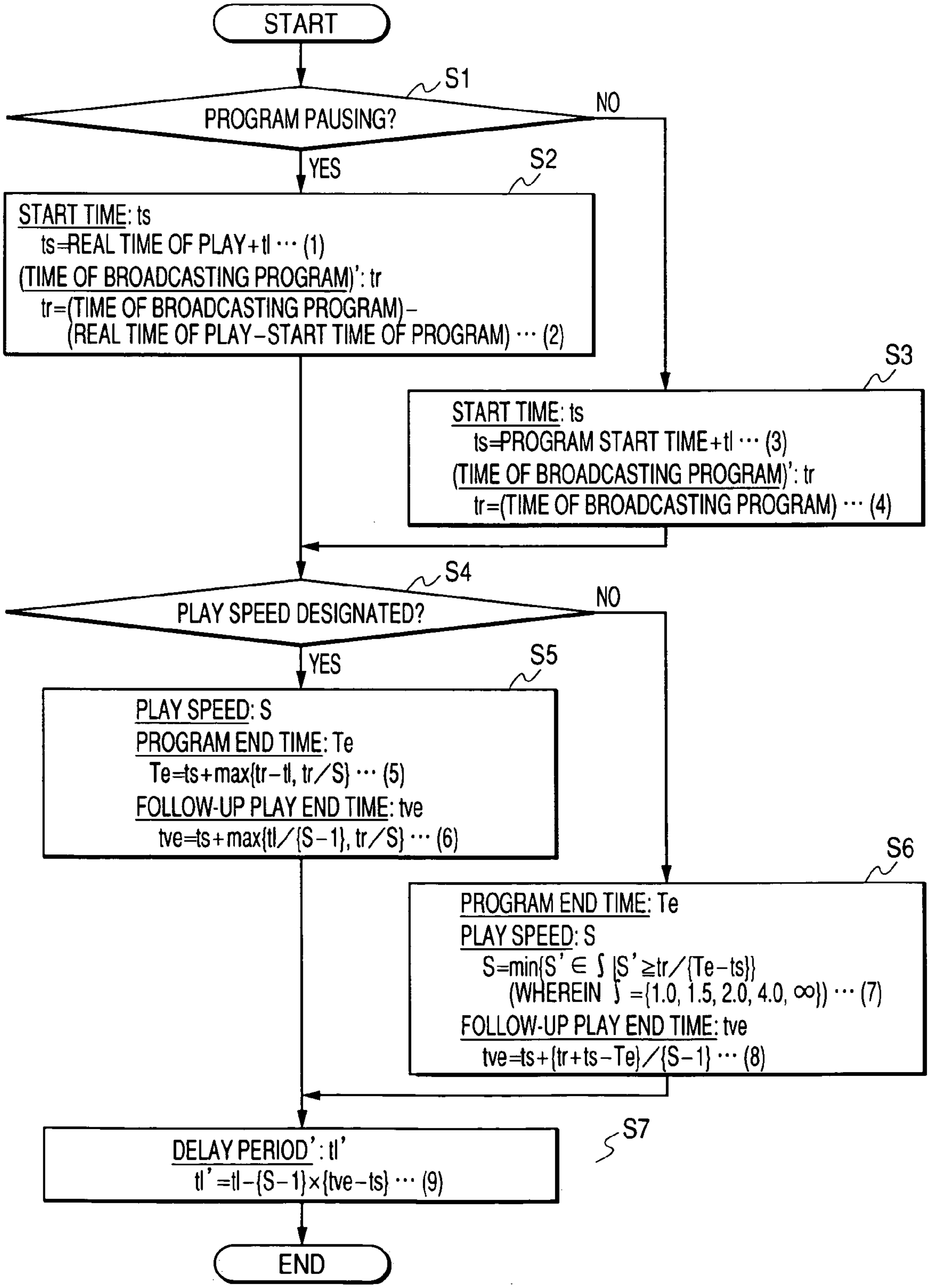
FIG. 6 is a flowchart showing the calculation processing of the delay schedule calculator 313 shown in FIG. 5.

FIG. 6 is a flowchart showing the calculation processing by the delay schedule calculator 313 shown in FIG. 5, which shows a method for deciding the playing speed s, start time ts, follow-up-playing end time tve and program end time te of follow-up playing on a designated program by using a delay time tl, playing present time, program broadcasting time and program start time.

Specifically, first in step S1 in FIG. 6, it is determined whether a purposed program to which the calculation processing is applied is a program being paused. When the processing is applied to the program being paused, step S2 is started. When the processing is not applied to the program being paused, step S3 is started. In step S2, as shown in FIG. 6, the start time ts is derived from an expression (1) and the program broadcasting time'tr is derived from an expression (2). That is, when the present program is a program being paused, it is derived that playing of broadcasting up to which point of time is completed by the time when the program is paused and the time at the point of time is used as playing present time. For example, a program whose broadcasting is started at 9:00 is played at one-time speed from 9:45 and at the point of time when 30 min passes (time is 10:15), a program broadcasted by 9:30 is played. Therefore, the playing present time is 9:30. Moreover, a program whose broadcasting is started at 9:00 is played at 1.5-time speed from 9:45 and at the point of time when 30 min passes (time is 10:15), a program broadcasted by 9:45 is played. Therefore, the playing present time is 9:45. The time obtained by adding the delay time tl to the playing present time is the start time. In step S3, the start time ts is derived from an expression (3) and the program broadcasting time'tr is derived from an expression (4). The program broadcasting time is the time from the broadcasting start time of a purposed program to the broadcasting end time of it. The program broadcasting time' tr shows that playing for what more hours must be performed.

Thereafter, step S4 is started to determine whether a playing speed is designated. When the playing speed is designated, step S5 is started. When the playing speed is not designated, step S6 is started. In step S5, the program end time te is derived from an expression (5) by using the playing speed s as a constant and the follow-up playing end time tve is derived from an expression (6). In step S6, the playing speed's is derived from an expression (7) by using the program end time Te as a constant and the follow-up playing end time tve is derived from an expression (8).

Thereafter, step S7 is started to derive a final delay time tl' from an expression (9).

<Schedule Deciding Operation at the Time of Follow-Up Playing>

Then, a series of operations for deciding a schedule according to designation of a program end time at the time of follow-up playing is described below by referring to FIGS. 7, 8A, 8B, 9A and 9B.

Figure 7:
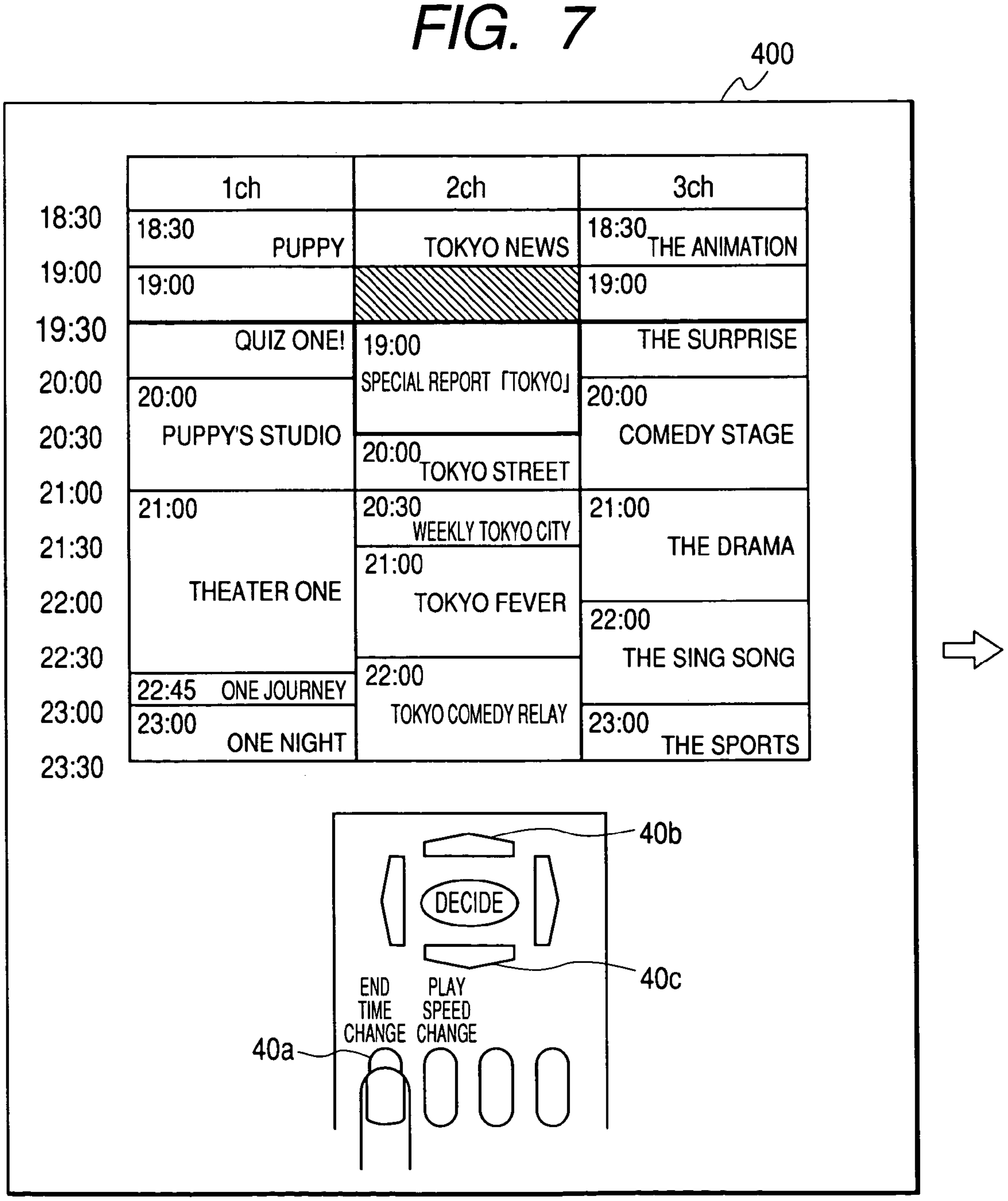
FIG. 7 is an illustration showing the operation for schedule decision at the time of follow-up playing in the second embodiment.

The state 400 in FIG. 7 shows a program table under a pause at the time of follow-up playing. In this case, when a user presses an end time change key 40*a* of the remote controller 116 and performs the operation for setting a program end time, it is possible to perform the operation denoting "advancing and delaying end time" by the top and bottom buttons 40*b* and 40*c* of the remote controller 116.

Figure 8A:
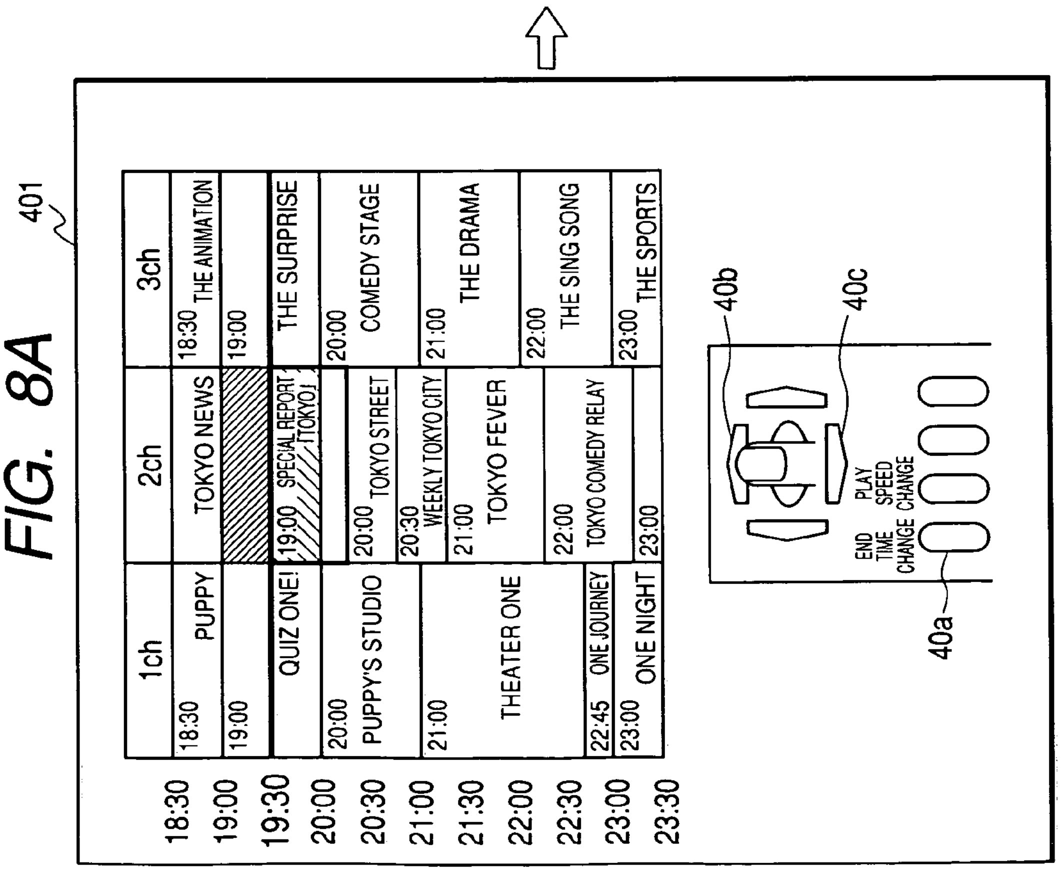
FIGS. 8A and 8B are illustrations showing the operation for schedule decision at the time of follow-up playing in the second embodiment.
Figure 8B:
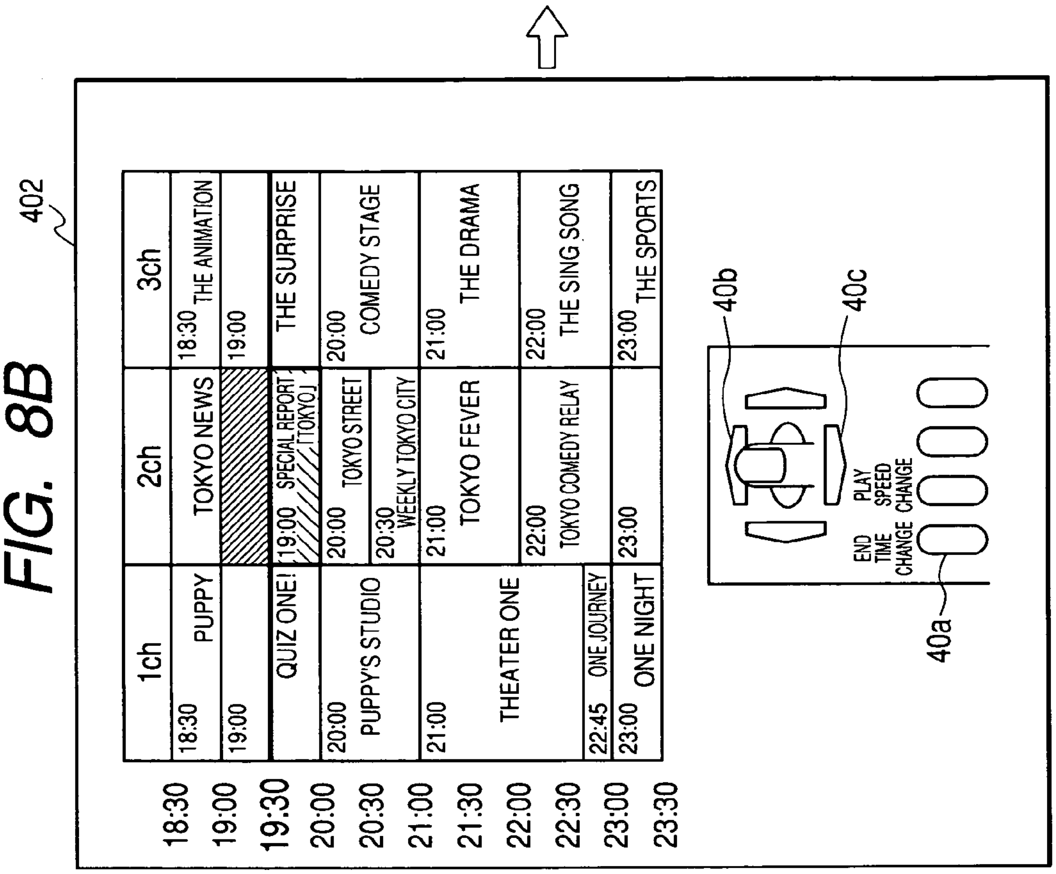
Figure 9B:
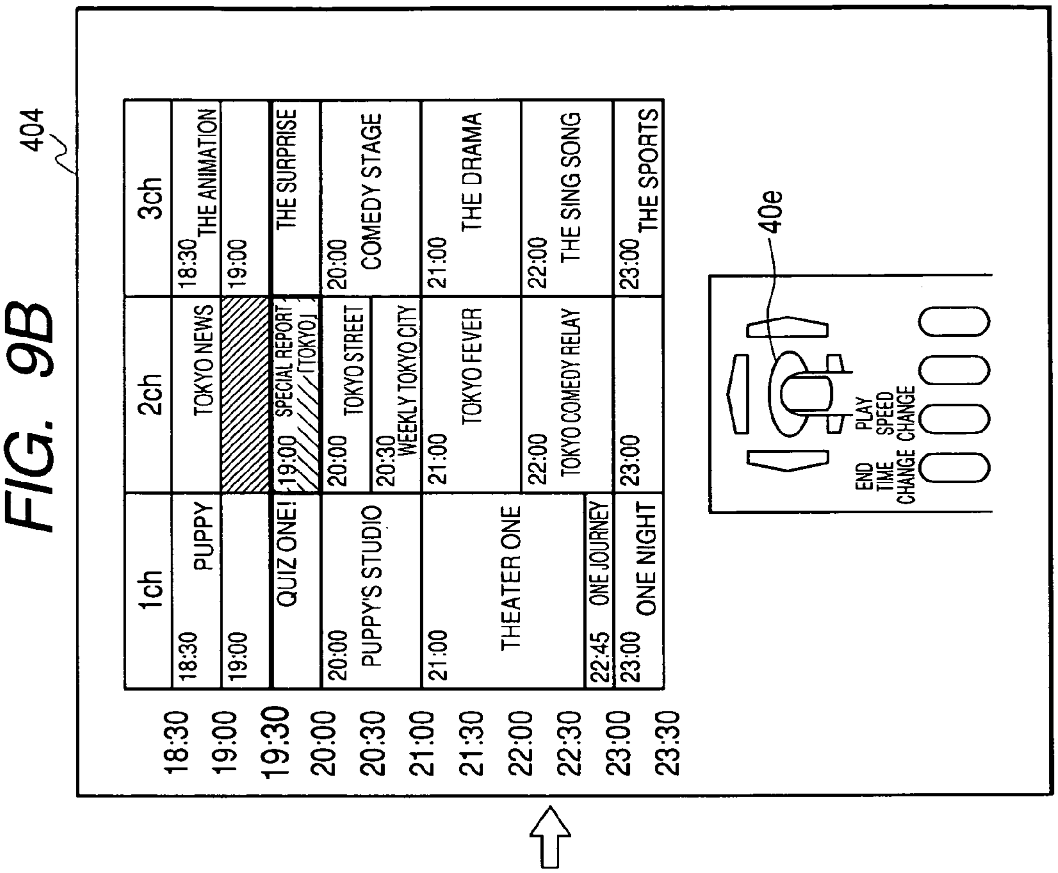
FIGS. 9A and 9B are illustrations showing the operation for schedule decision at the time of follow-up playing in the second embodiment.
Figure 9A:
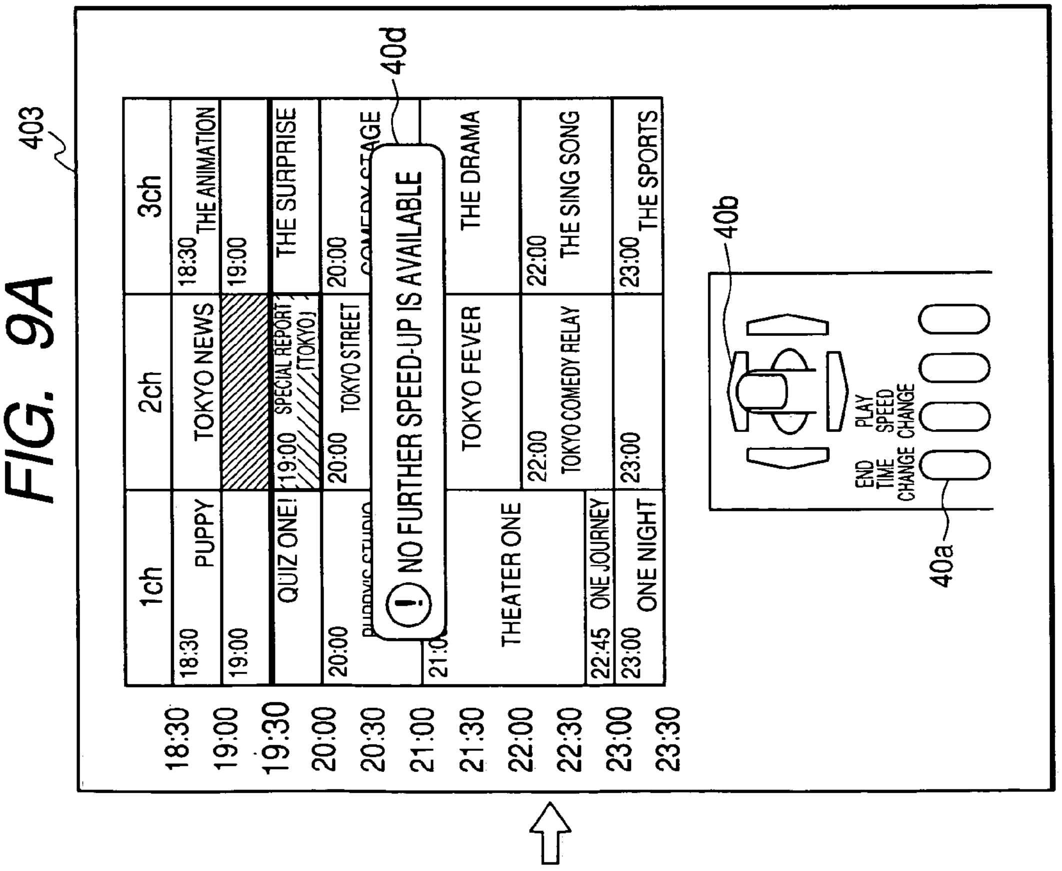

The state 401 in FIG. 8A shows a state in which the operation for "advancing the end time" is performed by pressing the top button 40*b* of the remote controller 116. Thereby, a purposed program group is laid out in accordance with the playing schedule by the delay schedule calculator 313. Moreover, by pressing the top button 40*b* and continuing the operation for "advancing the end time", a playing speed different from the case of the state 401 is selected like the case of the state 402 in FIG. 8B. When setting the playing speed earlier than the broadcasting time, an error display 40*d* is performed like the case of the state 403 in FIG. 9A. Thereafter, a schedule is decided by a decision button 40*e* like the case of the state 404 in FIG. 9B and an operation according to the schedule is started.

Then, a series of operations for deciding a schedule by designating a playing speed at the time of follow-up playing is described below by referring to FIGS. 10, 11A and 11B.

Figure 10:
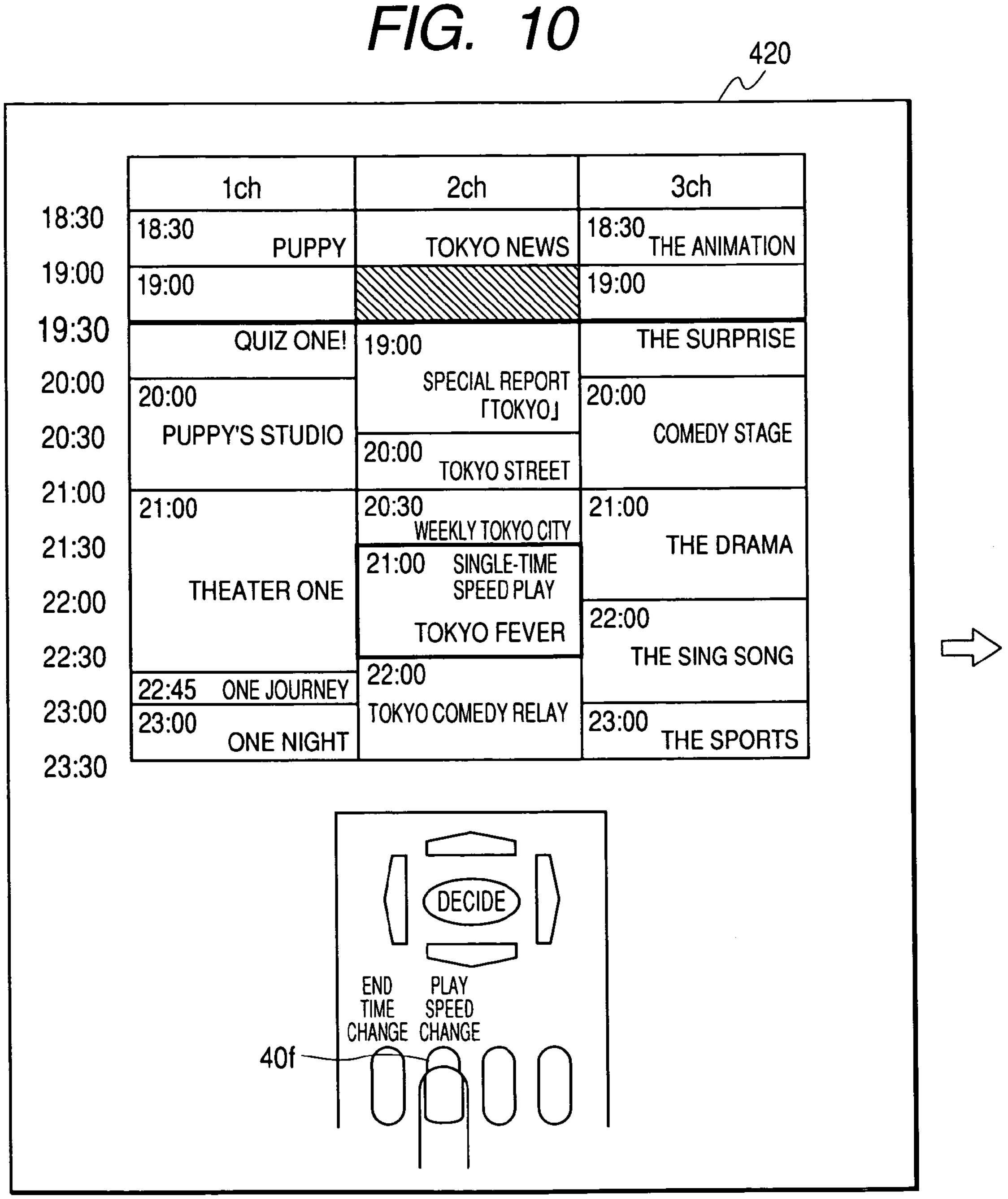
FIG. 10 is an illustration showing the operation for schedule decision at the time of follow-up playing in the second embodiment.
Figure 11B:
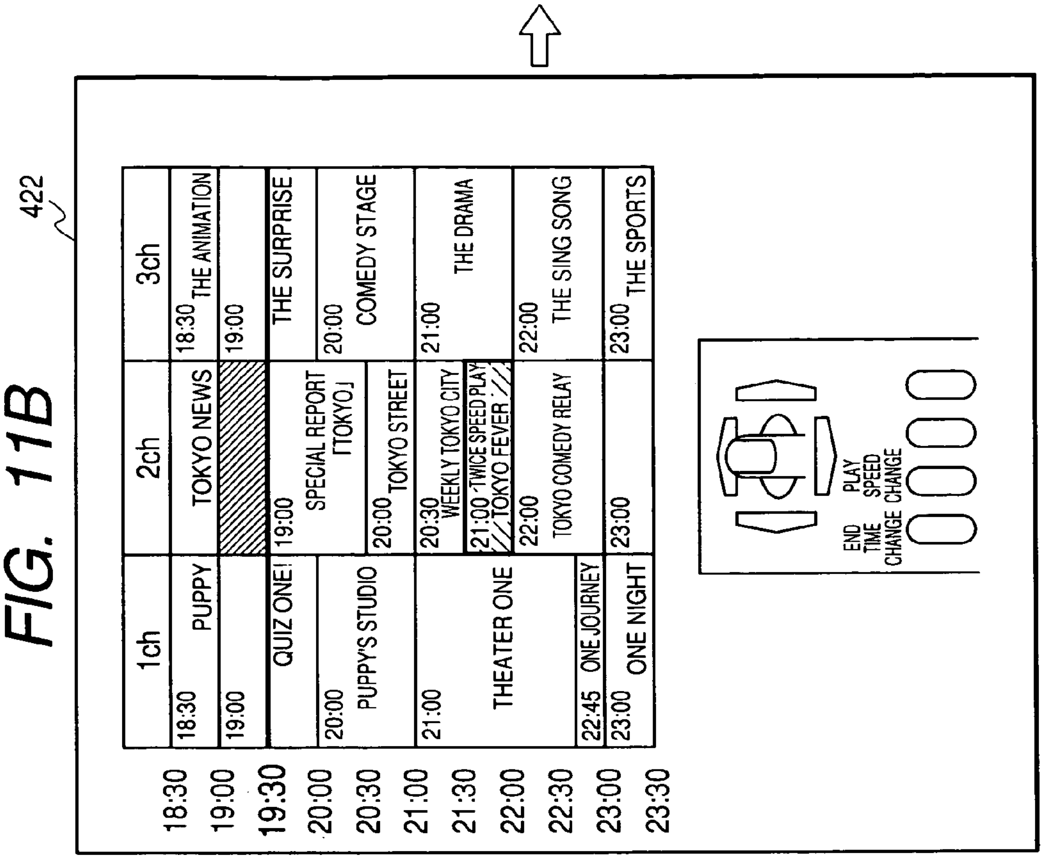
FIGS. 11A and 11B are illustrations showing the operation for schedule decision at the time of follow-up playing in the second embodiment.

The state 402 in FIG. 10 shows a program table in a state paused at the time of normal playing. In this case, when a user presses a playing-speed change key 40*f* of the remote controller 116 and performs the operation for setting a playing speed, it is possible to perform the operation denoting "advancing/delaying a playing speed" by top and bottom buttons 40*b* and 40*c* of the remote controller 116.

Figure 11A:
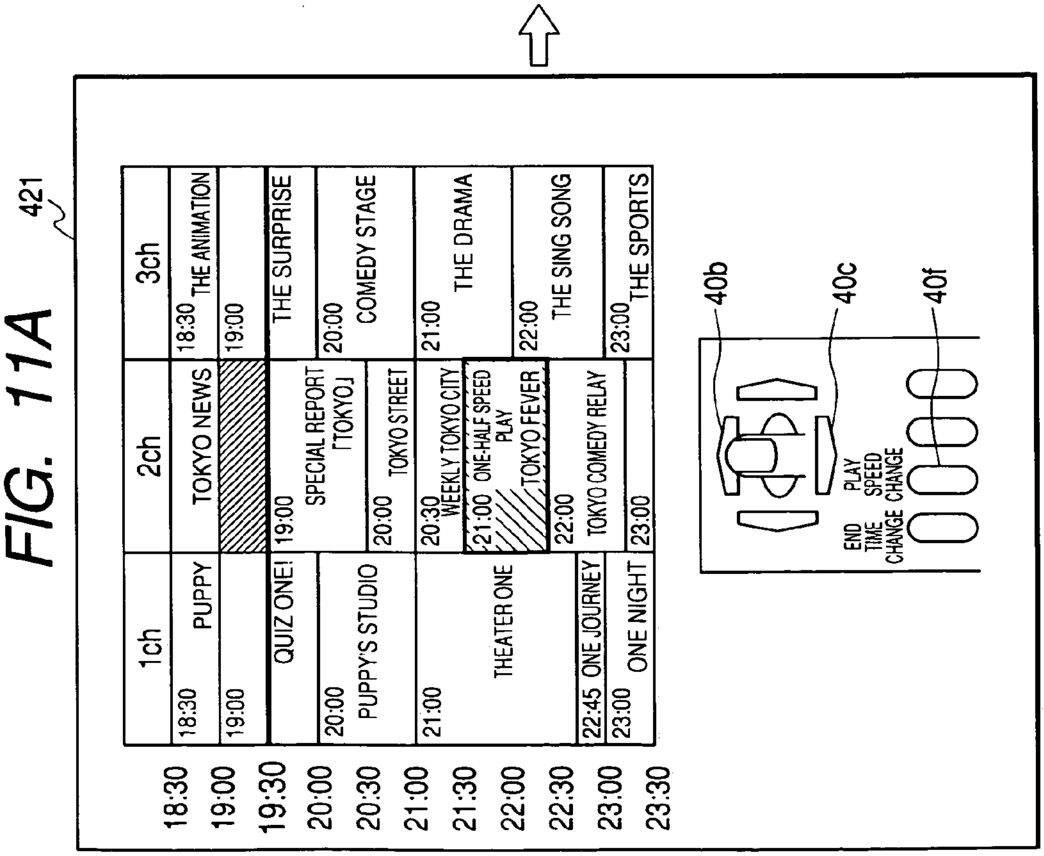
Figure 12B:
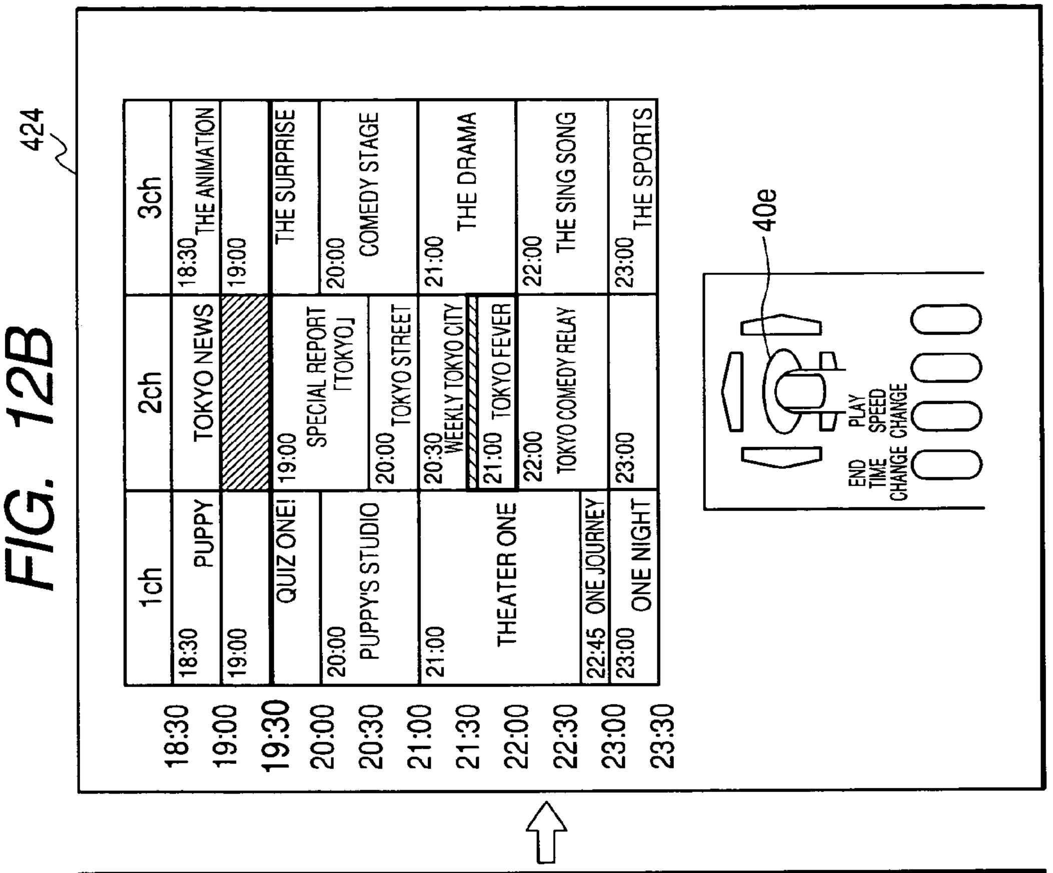
FIGS. 12A and 12B are illustrations showing the operation for schedule decision at the time of follow-up playing in the second embodiment.
Figure 12A:
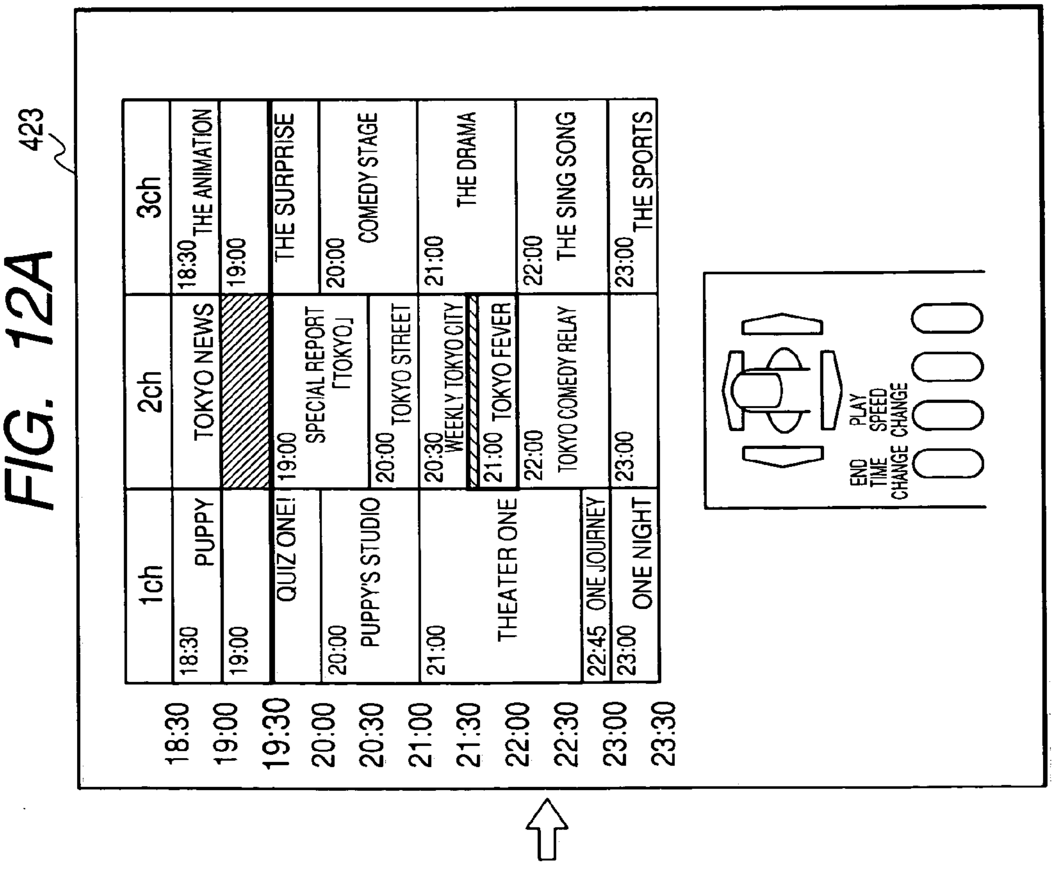

The state 421 in FIG. 11A is a state in which the "operation for accelerating a playing speed" is performed once and a purposed program group according to the playing schedule by the delay schedule accelerator 313 is laid out. Moreover, when pressing the top button 40*b* and continuing the operation for "accelerating the playing speed", a delay state at a playing speed different from the case of the state 424 in FIG. 12B is displayed like the case of the state 422 in FIG. 11B and the state 423 in FIG. 12A. Thereafter, a schedule is decided by the decision button 40*e* like the case of the state 424 in FIG. 12B and the operation according to the schedule is started.

As described above, in the case of this embodiment, by changing a program table and interactively deciding a schedule, a complex schedule can be realized by a simple operation without generating a minute schedule plan by being aware of the broadcasting time or end time of other program and it is possible to comfortably read a program table and provide a playing schedule operation.

Third Embodiment

<General Configuration of Apparatus>

Figure 13A:
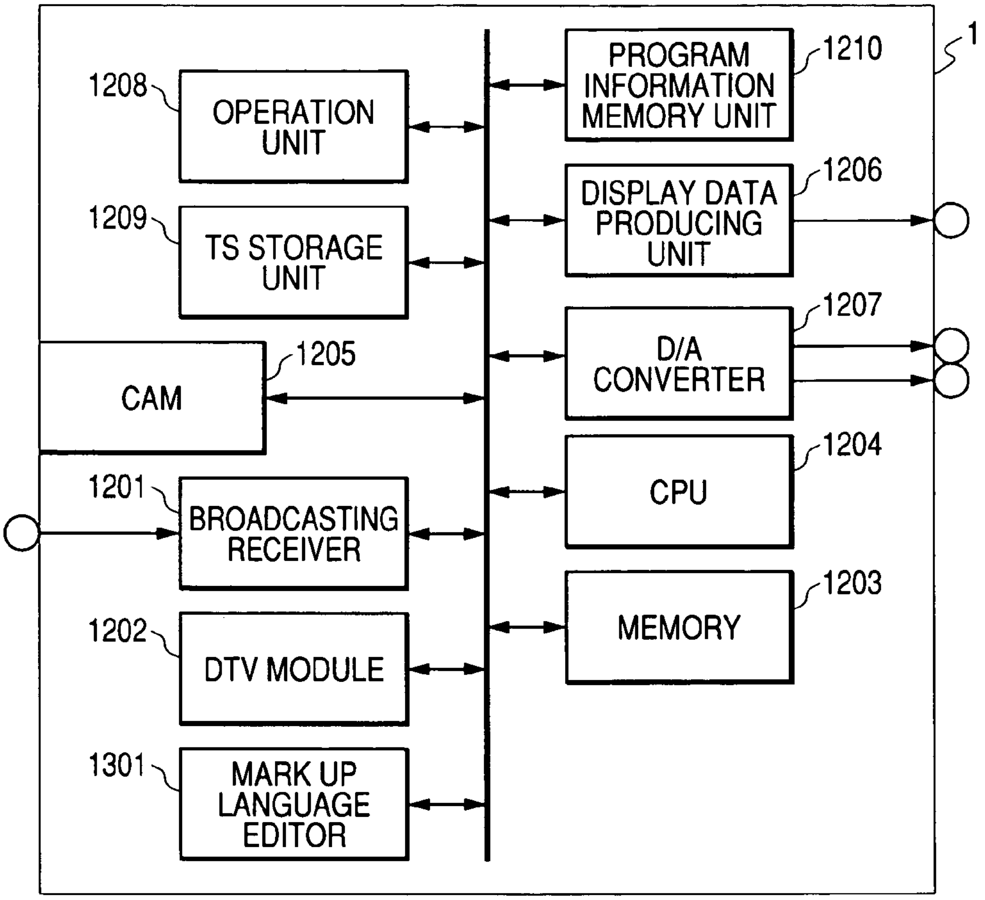
FIGS. 13A and 13B are block diagrams showing an apparatus for recording and playing digital broadcasting of third embodiment of the present invention.
Figure 13B:
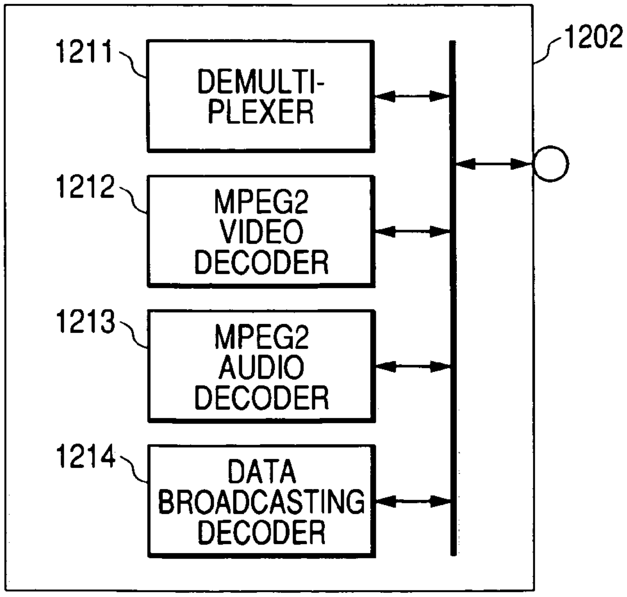
Figures 25, 26:
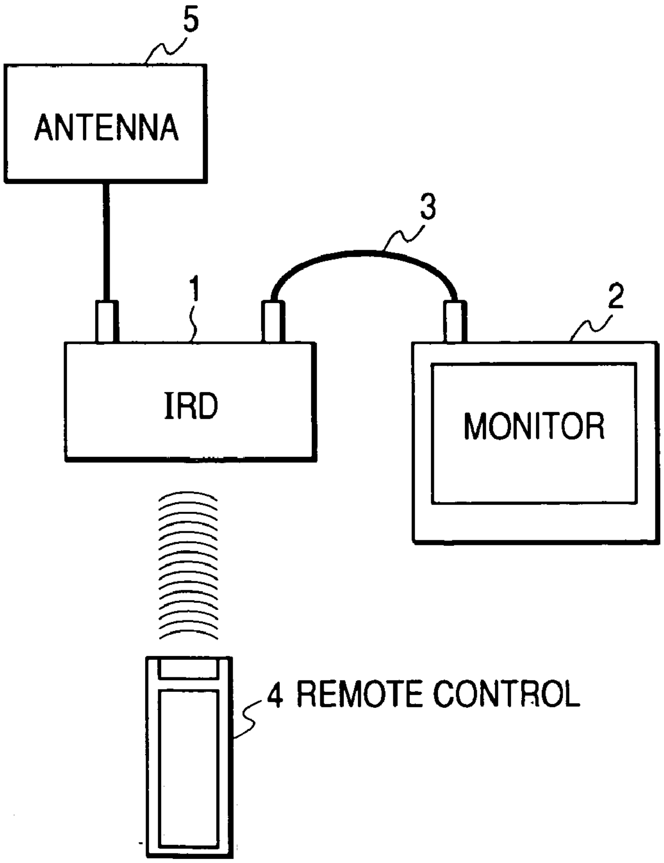
FIG. 25 is an illustration showing a playing method and a playing-speed deciding method of the apparatus in FIG. 24.
FIG. 26 is a conceptual view showing a configuration of a conventional digital-broadcasting receiving system.
Figure 27:
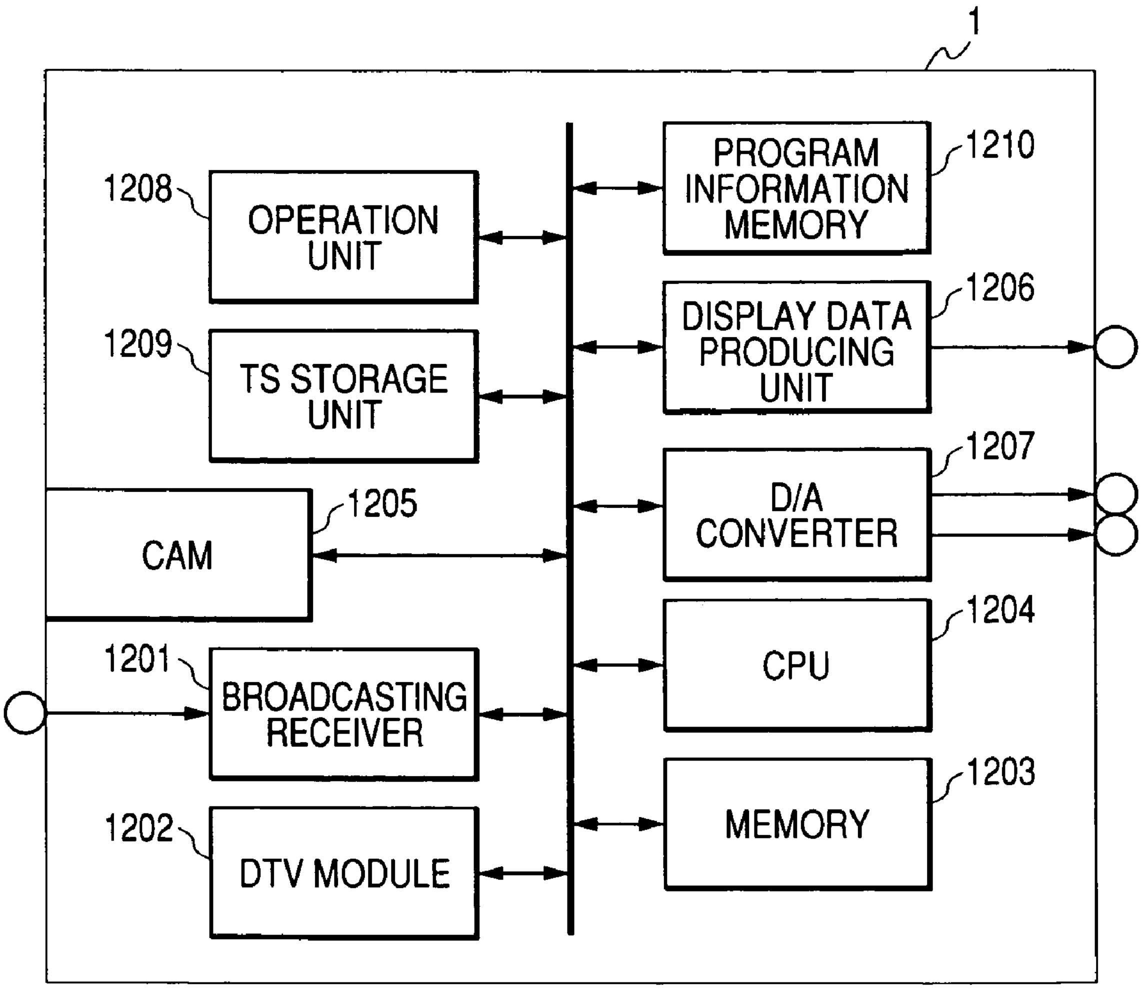
FIG. 27 is a block diagram showing a configuration of the IRD in FIG. 26.

FIGS. 13A and 13B are block diagrams showing a configuration of an apparatus for recording and playing digital broadcasting of third embodiment of the present invention, which is applied to the configuration of the IRD 1 in the previously-described system in FIG. 26 instead of a conventional configuration (shown in FIG. 27). FIG. 13A shows an essential configuration of the apparatus, FIG. 13B shows an internal configuration of the DTV module in FIG. 13A and a component same as that in FIG. 27 is provided with the same symbol.

The configuration of the IRD 1 of this embodiment has a feature that a mark-up language editor 301 is included which edits the program information on programs stored in the TS storage unit 1209 and a stored program list for selecting a program in accordance with the mark-up language format such as BML. That is, the mark-up language editor 301 relates the program information on programs stored in the TS storage unit 1209 among received service informations with stored broadcasting data by a mark-up language and puts them in writing. One or more program files put in writing by the mark-up language editor 301 are further related by the mark-up language and put in writing and stored in the TS storage unit 1209 as a stored program file.

In FIG. 13A, reference numeral 1201 denotes a broadcasting receiver for receiving a digital broadcasting signal from an antenna, selecting a station and outputting TS data and 1202 denotes a DTV module for inputting the TS data stored in the memory 1203 and outputting decoded image data and voice data and the data for the program information packet-ID(PID)-filtered.

Reference numeral 1203 denotes a memory for storing the data for images and voices decoded by the DTV module 1202 and PID-filtered program information.

Reference numeral 1204 denotes a CPU (central processing unit) for controlling the whole apparatus. The CPU 1204 performs control for decoding various table data values (PAT, NIT, PMT, BAT, SDT, EIT, TOT and CAT) for the service information which is the program information data stored particularly in the memory 1203, outputting the data values to a display data generator 1206 in the information to be displayed and storing the data to be stored as program information in the memory 1203.

Reference numeral 1205 denotes a conditional access module (CAM) which includes a IC card reader constituted by not-illustrated CPU, ROM and RAM and has a function for sorting enciphered TS by using a cipher decoding key and cipher decoding program included in an IC card and the demultiplexer 1211.

Reference numeral 1206 denotes a display data generator for converting a drawn image into a signal format suited for an indicator such as an NTSC in accordance with the decoded image data stored in the memory 1203 and the display data generated by the CPU 1204. Reference numeral 1207 denotes a D/A converter for outputting the decoded voice data stored in the memory 1203 as a voice signal of a stereo-voice or the like to an external unit.

Reference numeral 1208 denotes an operation unit for selecting a cannel through the operation of the remote controller 4 or the like and reference numeral 1209 denotes a TS storage unit using a medium such as a hard disk for storing the TS data output from the broadcast receiver 1201 and outputting the stored TS data. Reference numeral 1210 denotes a program information memory which does not loose the content even if turning off the power supply of the IRD 1 but which stores various table data values processed by the CPU 1204 and stored in the memory 1203 as program information for program selection.

<Internal Configuration of DTV Module 1202>

Then, the internal configuration of the DTV module 1202 is described below.

In FIG. 13B, reference numeral 1211 denotes a demultiplexer for filtering the TS data stored in the memory 1203 by a PID and sorting the data to various data values and reference numeral 1212 denotes an MPEG2 video decoder for decoding the MPEG2 image data sorted by the demultiplexer 1211.

Reference numeral 1213 denotes an MPEG2 audio decoder for decoding the MPEG2 voice data sorted by the demultiplexer 1211 and reference numeral 1214 denotes a data broadcasting decoder constituted by a BLM browser for decoding the data broadcasting data sorted by the demultiplexer 1211.

<BML File of Program Information Display Screen Data>

FIG. 14 is an illustration showing a BML file of the program information display screen data stored in the TS storage unit 1209 and this example is simplified for explanation.

Reference numeral 1401 in FIG. 14 denotes a display information tag and reference numeral 1402 denotes then information content of the display information tag 1401.

In the case of this example, a recorded date, time, program title and detailed program content are used as the display information tag 1401. As the display information, a category, cast, broadcasting station name and audiovisual restriction can be handled correspondingly to the information included in the service information content multiplexed on broadcasting data and they can be set by the mark-up language editor 301. Though the information content 1402 is a blank column, the content corresponding to this portion is actually written in the column. The content to be written is collected by the mark-up language editor 301 from the table data such as the EIT of service information and edited.

Therefore, the mark-up language editor 301 refers to program information corresponding to the display information tag 1401 to edit the information content 1402.

<BML File of Program Selection Display Screen Data>

FIG. 15 is an illustration showing a BML file of the program selection display screen data stored in the TS storage unit 1209 and this example is simplified for explanation.

In FIG. 15, reference numeral 1501 denotes a display item tag and reference numeral 1502 denotes the item content of the display item 1501.

In the case of this example, a recorded date is used for item 1, time is used for item 2, a program title is used for item 3 and simple program content is sued for item 4. As display items, it is possible to handle a category, cast and broadcasting station name correspondingly to the information included in the service information multiplexed on broadcasting data and they can be set by the mark-up language editor 301.

Though the item content 1502 is a blank column, the content corresponding to this portion is actually written in the column. The content to be written is collected by the mark-up language editor 301 from the table data such as the EIT of service information and edited.

Therefore, the mark-up language editor 301 refers to the program information corresponding to the display item tag 1501 when storing a program to edit the item content 1502.

<Automatic BML-File Edition>

Figure 16:
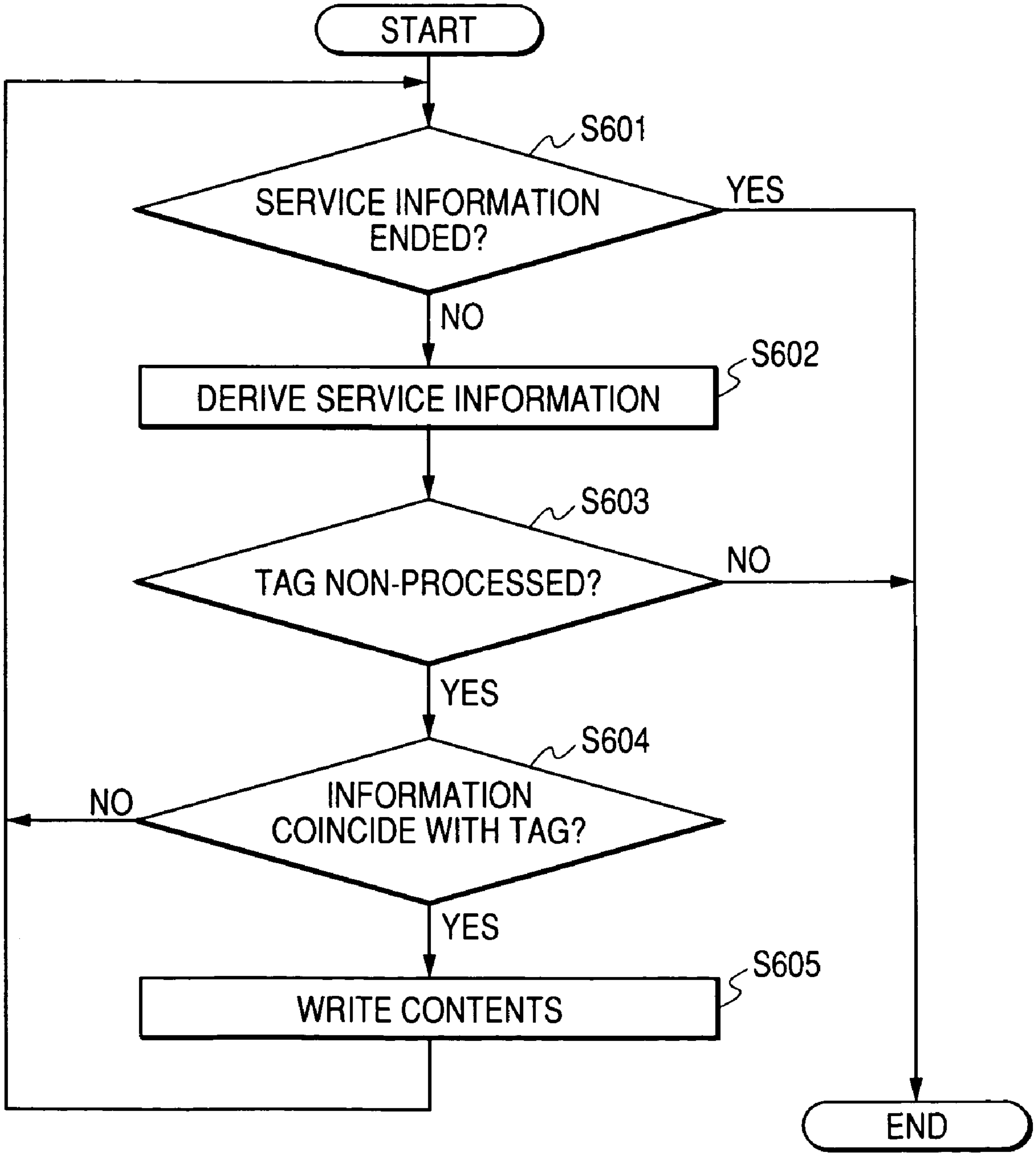
FIG. 16 is a flowchart showing an automatic BML-file edition in the third embodiment.

FIG. 16 is a flowchart showing the automatic BML edition in the third embodiment, which shows the operation in which the BML file of the display screen data in program information and stored program list is edited by the mark-up language editor 301 in accordance with service information.

When the storing operation is started, the processing is first performed which edits the BML file of the display screen data in the program information. The mark-up language editor 301 determines whether the service information not processed in step S601 is left in order to process the display information tag 1401 (refer to FIG. 14) in which the information content 1402 is a "blank column". When the whole service information is processed, edition is completed. When service information is left, the service information is derived in step S602.

In the next step S603, it is determined whether not-processed display information tag 1401 is left. When every display information tag 1401 is processed, edition is completed. When the display information tag 1401 is left, it is determined in the next step S604 whether there is a case in which service information coincides with the display information 1401. When there is not any case in which the service information coincides with the display information 1401, step S601 is restarted to continue the processing. When there is a case in which the service information coincides with the display information 1401, the content of the service information is written in the information content 1402 in step S605 and step S601 is restarted to continue the processing.

Completion of the processing becomes completion of the BML file edition of the display data in the program information.

Then, when the storing operation is completed, the processing for editing the BML file of the display screen data in the stored program list is performed. The mark-up language editor 301 determines whether service information not processed in step S601 is left in order to process the display item tag 1501 in which the item content 1502 is a "blank column". When the whole service information is processed, edition is completed. When service information is left, the service information is deprived in step S602.

In the next step S603, it is determined whether not-processed display item 1501 is left. When the whole display item 1501 is processed, edition is completed. When the display item 1501 is left, it is determined in the next step S604 whether there is a case in which the service information coincides with the display item 1501. When there is not a case in which the service information coincides with the display item 1501, step S601 is restarted to continue the processing. When the service information coincides with the display item 1501, the content of the service information is written in the item content 1502 and step S601 is restarted to continue the processing.

Completion of this processing becomes completion of the BML file edition of the display screen data in the stored information list.

<Display Example of Program Selecting Display Screen>

Figure 17:
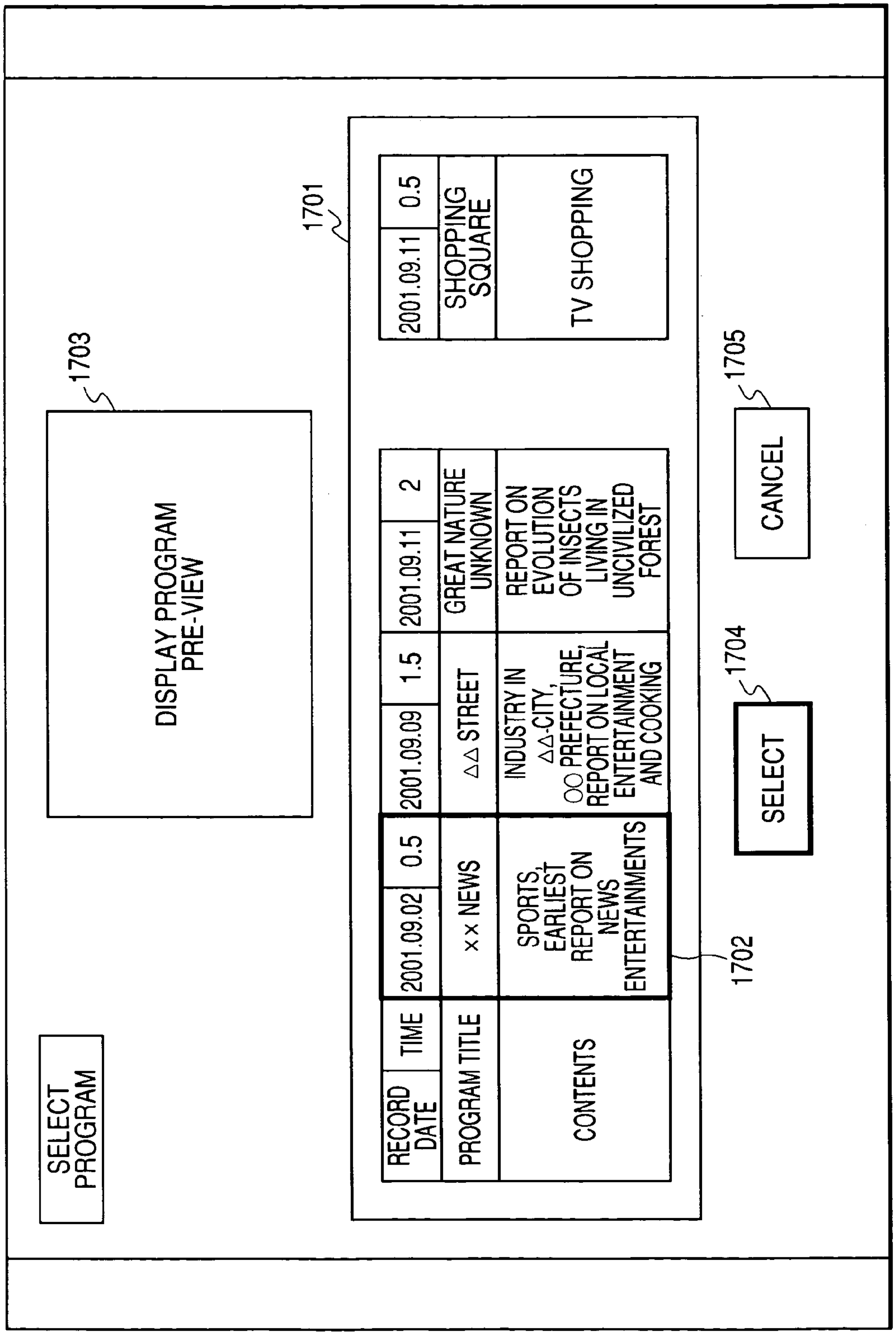
FIG. 17 is an illustration showing a display example of a program selecting display screen.

FIG. 17 is an illustration showing a display example of the program selection display screen displayed on the monitor 2.

Reference numeral 1701 in FIG. 17 denotes a program list for selecting a program and reference numeral 1702 denotes a selection cursor which moves correspondingly to an operation of the remote controller 4. Reference numeral 1705 denotes a program preview screen of the broadcasting selected by the selection cursor 1702, 1703 denotes a selection button for selecting a program and 1704 denotes a cancel button for stopping playing of a program.

The program selection display screen is displayed on the monitor 2 when a user selects a program selecting function. This display operation is performed by using the data broadcasting decoder 1214 because the program selection display screen data is a BML file. The program list 1701 displays the content edited by the mark-up language editor 301. By selecting and deciding the content in accordance with an operation of the remote controller 4, the data broadcasting decoder 1214 operates by decoding the selected and decided content.

When moving the selection cursor 1702 to select the program list 1701, a selected program is displayed on the program preview screen 1703 and can be confirmed. Moreover, by selecting the selection button 1704 in an operation of the remote controller 4 and pressing the decision button of the remote controller 4, a corresponding program information display screen (to be described later) is displayed. Or by selecting the cancel button 1705 and pressing the decision button of the remote controller 4, selection of stored program is completed.

All of this operation content conforms to the program selection display screen data described by the mark-up language.

<Display Example of Program Information Display Screen>

Figure 18:
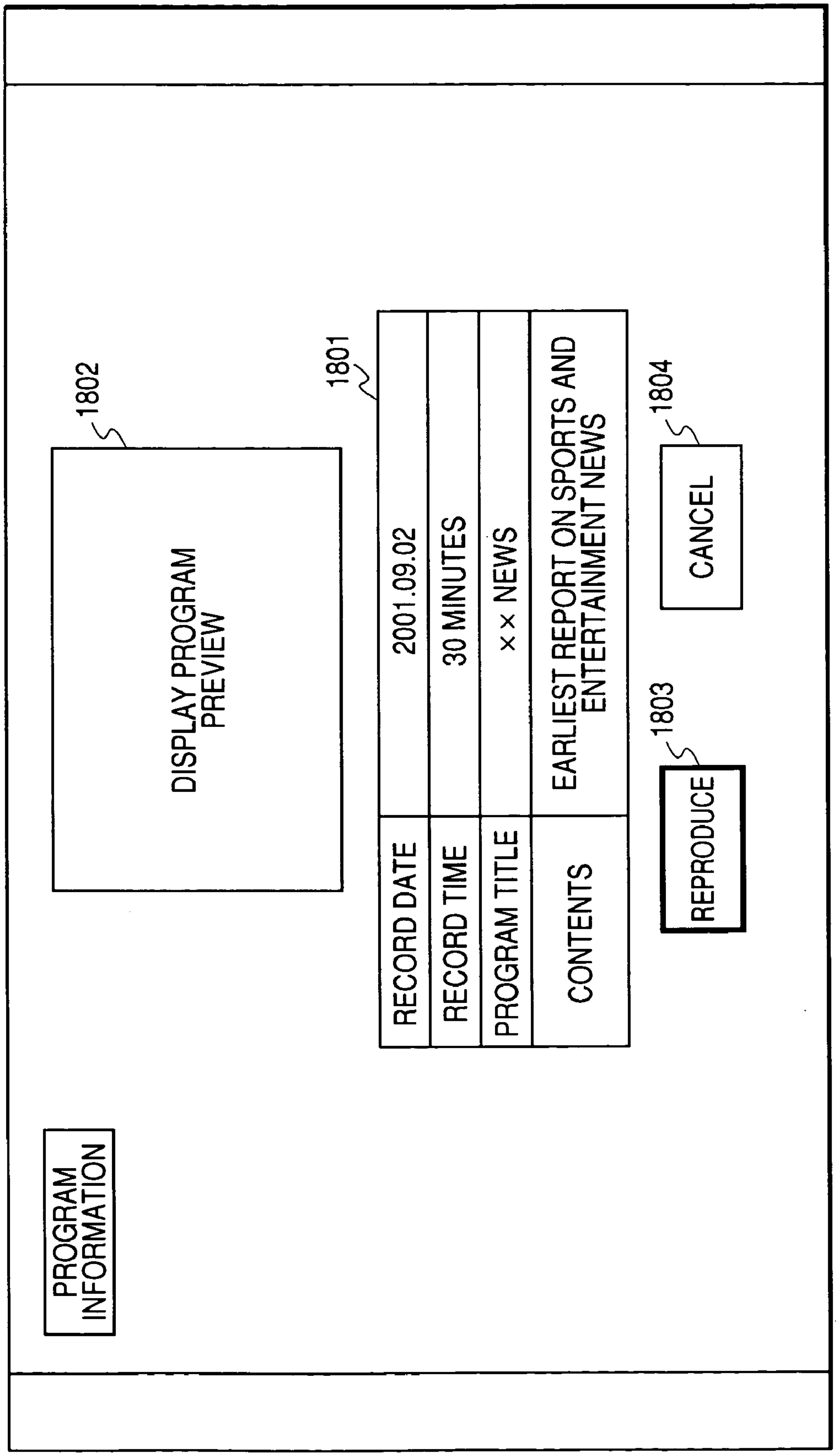
FIG. 18 is an illustration showing a display example of a program information display screen.

FIG. 18 is an illustration showing a display example of the program information display screen displayed on the monitor 2 when selecting a program on the above-described program selection display screen.

Reference numeral 1801 in FIG. 18 denotes a program information content and 1802 denotes a program preview display. Reference numeral 1803 denotes a playing button for playing a program and 1804 denotes a cancel button for stopping playing of a program.

The program information display screen is displayed when a user selects a program on the above-described program selection display screen. This display operation is performed by using the data broadcasting decoder 1214 because the program information display screen data is a BML file. By being selected and decided in an operation of the remote controller 4, the data broadcasting decoder 1214 operates by decoding the selected and decided content.

Program information content 1801 displays the content edited by the mark-up language editor 301. In FIG. 18, a cursor is located at the playing button 1803 and playing of a program is started by pressing the decision button of the remote controller 4. Or when pressing the cancel button 1804, the program selection display screen is displayed again.

All of these operation contents conform to program information display screen data described by the mark-up language.

Thus, by using a program information file and stored program list described by the mark-up language, it is possible to display a program selection display screen and program information display screen without using an exclusive application. That is, program selection display screen data and program information display screen data are generated by using a data broadcasting decoder set to a digital broadcasting receiver as a standard function to draw a program selection display screen and program information display screen necessary to audiovisually get a recorded program and using the mark-up language such as BML used to describe a display screen of data broadcasting. Therefore, it is possible to easily change the program selection display screen and program information display screen to a display configuration and display content suitable for the usability of a user.

Thereby, by displaying a selected program together with a program being broadcasted or to be broadcasted as a program table in which time axes of the programs are common, it is possible to easily view a relation between the playing time of the program and the broadcasting time of the program being broadcasted or to be broadcasted.

Fourth Embodiment

Figure 19:
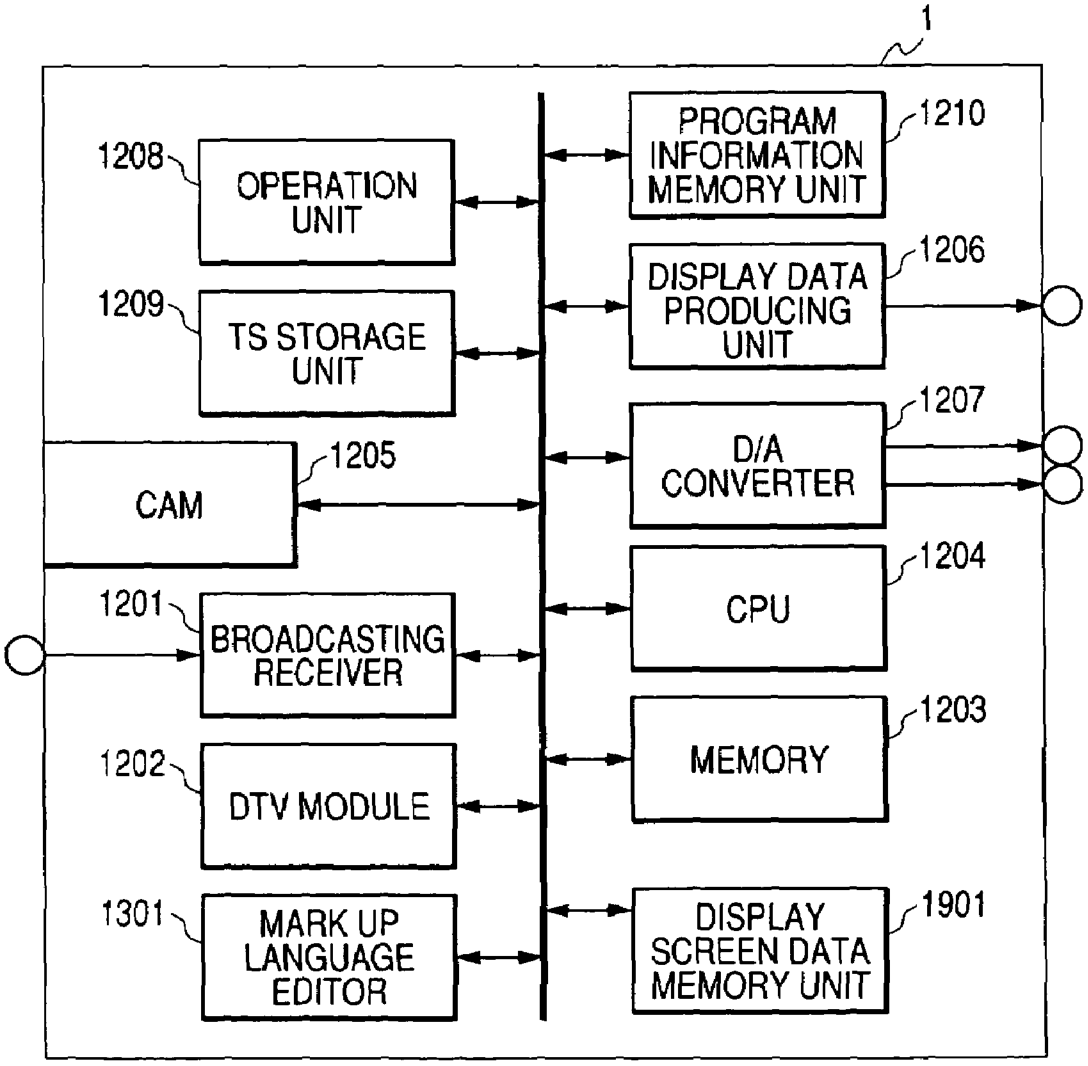
FIG. 19 is a block diagram showing a configuration of an apparatus for recording and playing digital broadcasting of fourth embodiment of the present invention.

FIG. 19 is a block diagram showing a configuration of an apparatus for recording and playing digital broadcasting of fourth embodiment of the present invention, which is applied to the configuration of the IRD 1 in the previously described system in FIG. 26 instead of the configuration (shown in FIG. 27). A component common to that of the configuration of the third embodiment shown in FIGS. 13A and 13B is provided with the same symbol and its description is omitted.

The configuration of the IRD 1 of this embodiment has a feature that a nonvolatile display screen data memory 1901 in which the content of a program selection display screen is described in accordance with the mark-up language such as BML is stored is used for the configuration in FIG. 13A.

Moreover, BML file examples of the program information display screen data and program selection screen data are the same ad those shown in FIGS. 14 and 15.

<Display Example of BML File Editing Operation>

Figure 20:
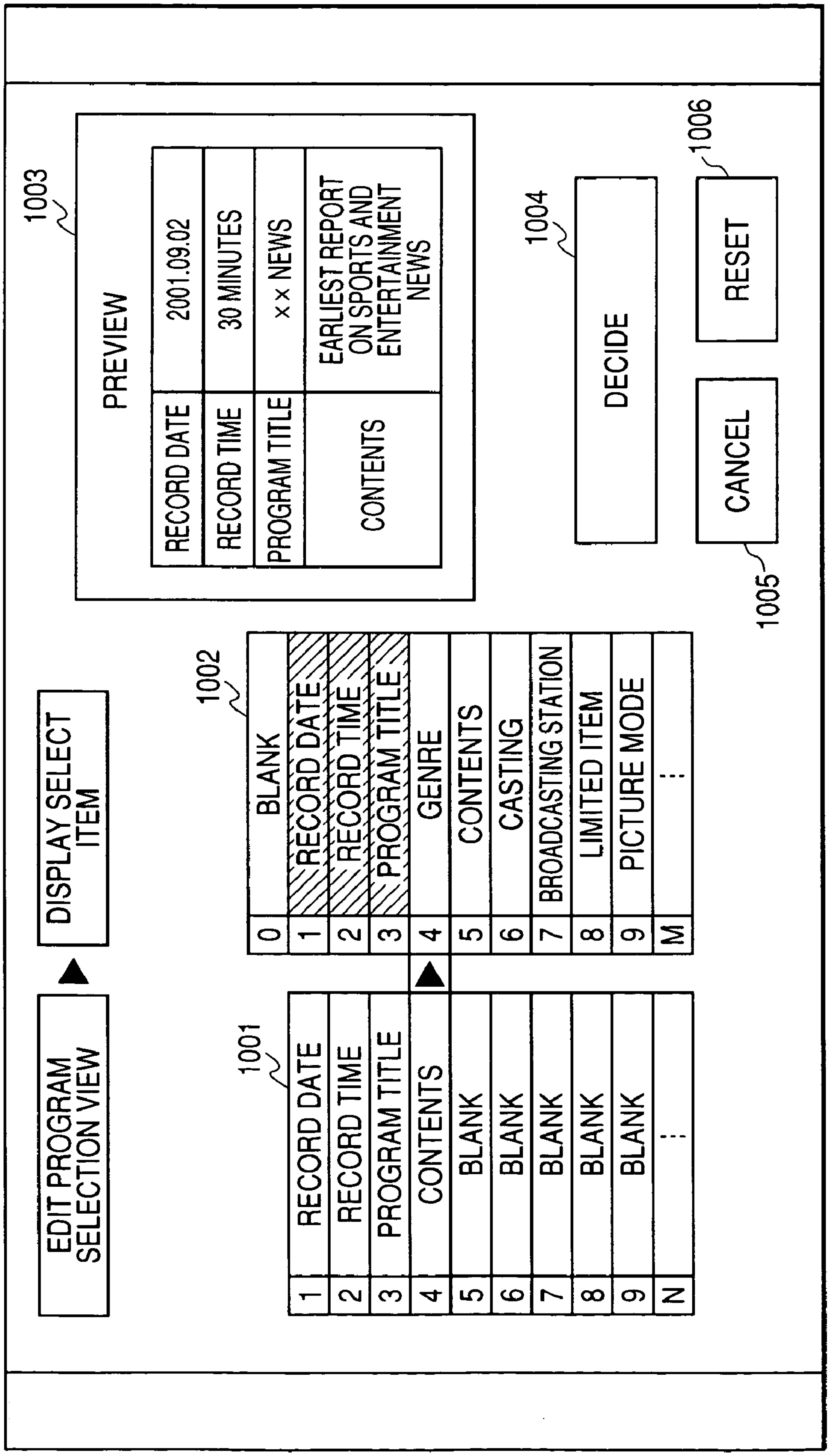
FIG. 20 is an illustration showing a display screen example of a BML file edition operation.

FIG. 20 is an illustration showing a display screen example of the BML file editing operation, which shows an editing screen of the display information tag 1401 in the BML file of the program information screen data in FIG. 14 generated by the mark-up language editor 301.

A program information file serving as a model of edition is stored in a display screen data memory 901 and the edited program information file is separately stored in the display screen data memory 901.

Reference numeral 1001 in FIG. 20 denotes the display information corresponding to the selected display information tag 1401 and 1002 denotes a service information list corresponding to the table data for the service information constituting the display information 1001. Reference numeral 1003 denotes a preview screen of the display information 1001 selected at present and 1004 denotes a decision button for adopting and completing the display information 1001 selected at present as new display screen data.

Reference numeral 1005 denotes a cancel button for canceling the display information 1001 selected at present and adopting and completing display screen data to be edited and 1006 denotes a reset button for canceling the display information 1001 selected at present and returning the information 1001 to an initially-set display screen data.

<BML File Editing Operation of Fourth Embodiment>

Figure 21:
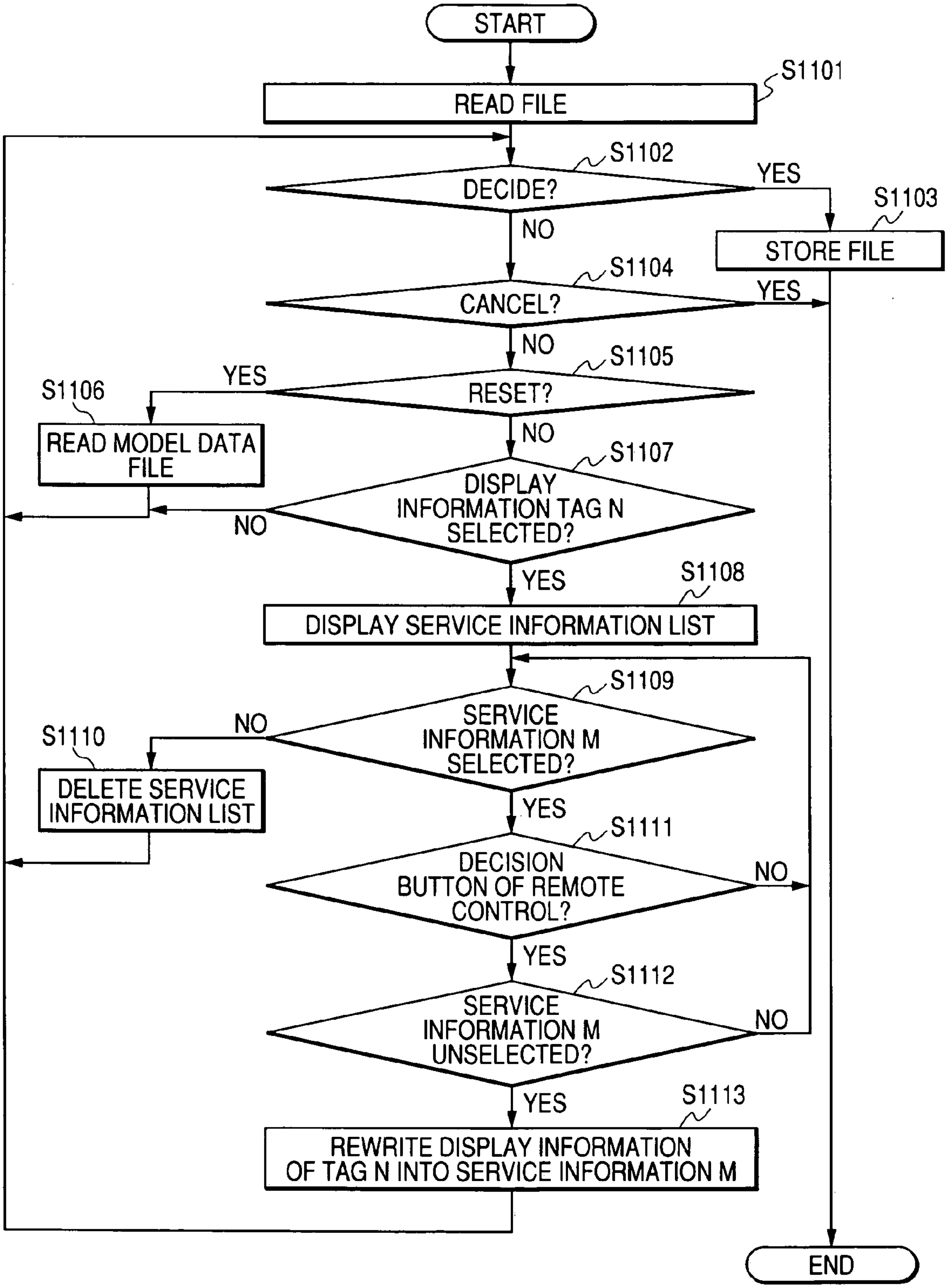
FIG. 21 is a flowchart showing a BML file edition operation of the fourth embodiment.
Figure 22:
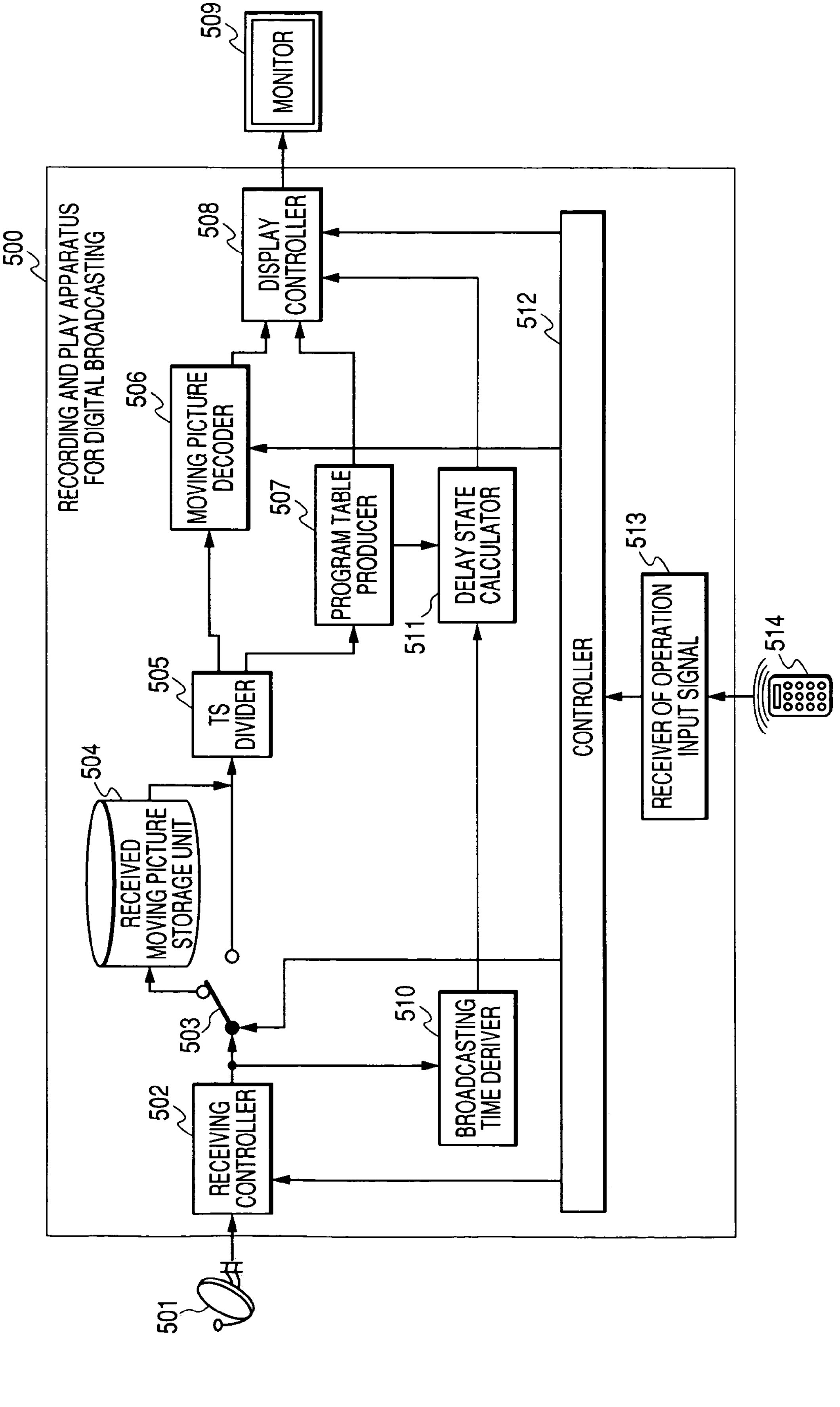
FIG. 22 is a block diagram showing a configuration of a conventional apparatus for recording and playing digital broadcasting.
Figure 23:
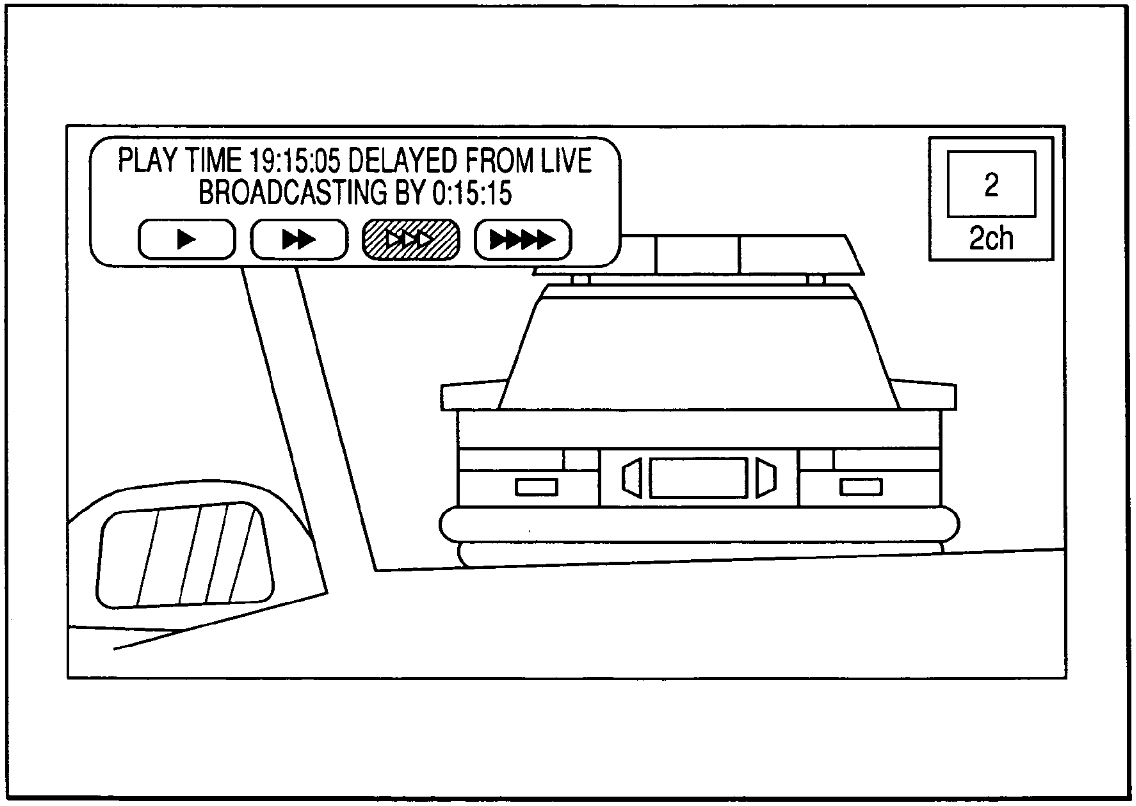
FIG. 23 is an illustration showing an input screen of a playing speed at the time of conventional follow-up playing.
Figure 24:
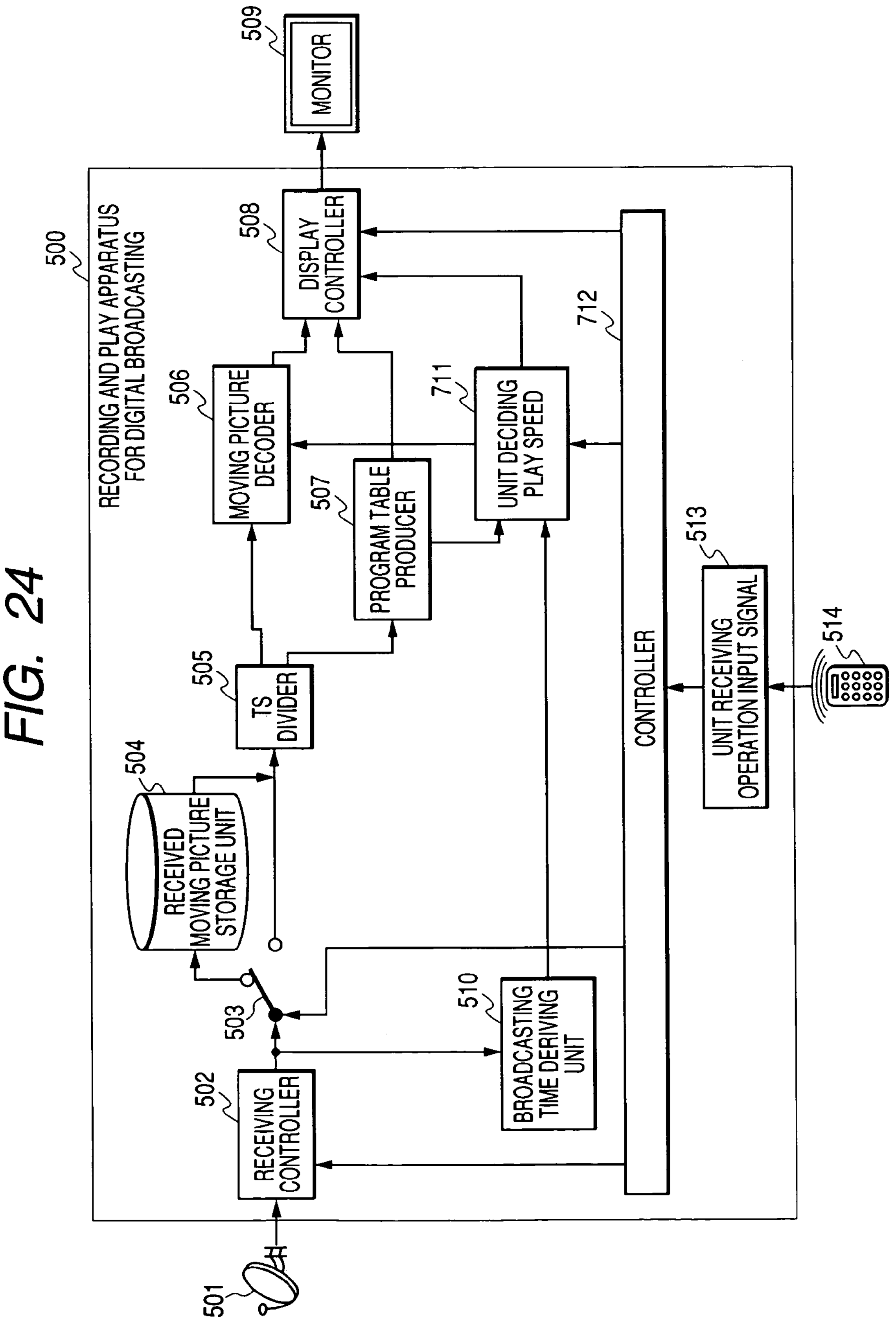
FIG. 24 is a block diagram showing a configuration of a conventional apparatus for recording and playing digital broadcasting.

FIG. 21 is a flowchart showing the BML file editing operation of the fourth embodiment, which shows the editing operation of the display information tag 1401 of the program information display screen data BML-filed by the mark-up language editor 301.

All of editing operations by the mark-up language editor 301 are performed by the remote controller 4 and a user can select an item without being aware of editing the mark-up language. The content of the selected display information 1001 is edited as the display information tag 1401.

When selecting a function for editing the BML file of the program information display screen data, the BML file of the program information display screen data is read in step S1101.

The example shown in FIG. 20 shows that the fourth item of the display information 1001 is edited. The display information of N=4 is selected in step S1107 and the service information list 1002 is displayed in step S1108. A user selects the "content" of the service information list 1002 of M=5 in step S1109 and is going to press the decision button of the remote controller 4 in step S1111.

When pressing the decision button of the remote controller 4, the service information list 1002 of M=5 passes through the determination in step S1112 because it is not selected and the display information 1001 of N=4 is rewritten to the service information list 1002 of M=5 in step S1113.

The "content" of the service information list 1002 is described in the bracky-type event descriptor and extension-type event descriptor and corresponds to the information on these descriptors. Other service information lists 1002 respectively correspond to the table data for service information.

The gray portion of the service information list 1002 shows that the portion is already selected. Even if pressing the decision button of the remote controller 4 with the service information list 1002 in step S1112, the display information 1001 is not rewritten and selection of the service information list 1002 is continued. Moreover, when excluding selection from the service information list 1002 in step S1109, the display of the service information list 1002 is erased in step S1110.

Then, when selecting the decision button 1004 and pressing the decision button of the remote controller 4 in step S1102, the editing operation stored in the display screen data memory 901 is completed as the BML file of the program information display screen data in step S1103. Moreover, when selecting the cancel button 1005 and pressing the decision button of the remote controller 4 in step S1104, the program information display screen data presently being edited is broken and the editing operation is completed.

Furthermore, when selecting the reset button 1006 and pressing the decision button of the remote controller 4 in step S1005, the program information display screen data presently being edited is broken and a model data file of the program information display screen data is read, the display information 1001 is initialized, and edition is continued.

Furthermore, it is possible to confirm the content of the display information 1001 being edited with the preview screen 1003 and the end of this processing becomes the edition end of the BML-filed program information display screen data.

Similarly, it is possible to edit the display item tag 1501 of the BML-filed program selection display screen data as shown in FIG. 15.

The program selection display screen data edited by a user by using the mark-up language editor 301 is displayed when the user selects a program selecting function. Display contents are shown in FIGS. 17 and 18. In this case, it is possible to change the display contents in accordance with the taste of a user because the display contents can be edited.

Moreover, the edited program selection data and program display screen data are displayed by using the data broadcasting decoder 1214 similarly to the case of the third embodiment because the data values are BML files or decoded by the data broadcasting decoder 1214 and operated when a user selects and determines a program selecting function by operating the remote controller 4. All of display contents conform to the description of the display screen data edited by using the mark-up language editor 301.

In the case of this embodiment, it is possible to easily change the program information display screen and program selection display screen to a display configuration and display content suitable for the usability of a user without using exclusive application software. Moreover, because model data obtained by describing the content of the program selection display screen in accordance with the mark-up language such as BML is used, it is possible to more easily change the display configuration and display content.

Though not illustrated, by preparing a function capable of editing a stile sheet file, it is possible to change the display content to a display content further suitable for the usability of a user. That is, by changing a stile sheet file for designating a display method when decoding a program information file and a stored program list file, it is possible to easily change the size of a character or a graphic or the design of a layout.

The present invention is not restricted to apparatuses of the above-described embodiments. It is allowed to apply the present invention to a system constituted by a plurality of units or an apparatus constituted by one unit. It is needless to say that the present invention is also completed when a storage medium storing a program code of the software for realizing functions of the above-described embodiments is supplied to a system or apparatus and the computer (CPU or MPU) of the system or apparatus reads and executes the program code stored in the storage medium.

In this case, the program code itself read from the storage medium realizes the above described embodiments and the storage medium storing the program code constitutes the present invention. A storage medium for supplying a program code can use a floppy (registered trademark) disk, hard disk, optical disk, magneto-optical disk, CD-ROM, CD-R, magnetic tape, nonvolatile memory card or ROM. Moreover, it is needless to say that by executing a program code read by a computer, functions of the above-described embodiments are realized, and a case is included in which an OS working on the computer performs a part or all of actual processing based on the instruction of a program code and functions of the above-described embodiments are realized by the processing.

Moreover, it is needless to say that after a program code read from the storage medium is written in a memory of a function extending board inserted into the computer or a function extending unit connected to the computer, a CPU set to the extending board or extending unit processes the extending function to perform a part or all of actual processing based on the instruction of the next program code and functions of the above-described embodiments are realized by the process.

This application claims priority from Japanese Patent Application Nos. 2003-344729 filed on Oct. 2, 2003, and 2004-280434 filed on Sep. 27, 2004, which are hereby incorporated by reference herein.

What is claimed is:

1. A moving picture recording and playing apparatus capable of storing, in a store unit capable of storing moving picture data, moving picture data of a program being broadcasted through a channel of a broadcast wave, and capable of playing the stored moving picture data with a delay of a desired time period, said apparatus comprising:

a storing unit for storing, in the store unit, moving picture data of a program being broadcasted on a predetermined channel selected from a plurality of channels according to a user's designation;

a playing unit for playing the moving picture data of a program stored in the store unit;

a designation unit for designating a playing speed of the moving picture data being played by the playing unit;

a calculation unit calculating a playing end time of the moving picture data, and a difference between the playing end time and a program end time in an original broadcasting of the program being stored in the store unit as a delay time, based on the playing speed designated by the designation unit, the calculation unit judging whether playing the program corresponding to the stored moving picture data by the playing unit is currently paused, thereby switching over a calculation method of the delay time in accordance with a judgment result; and a generation unit for generating a program table data formed from a plurality of program information including programs at least being broadcasting based on program information data received through the broadcast wave, wherein the generation unit generates a program table data indicating that the broadcasting time of a program to be broadcasted on the predetermined channel is delayed by the delay time, and updates the generated program table data in accordance with the play speed of the program being changed by the designation unit, so as to indicate an updated delay state in which the program to be broadcasted on the predetermined channel is delayed by the delay time calculated by the calculation unit based on the changed playing speed, wherein the program table data being the program information of the predetermined channel and program information of the other channels are arranged in parallel with regard to the present time as a standard, and wherein the generation unit generates an error display for indicating that the playing end time cannot be advanced, to cause a display unit to display the generated error display, if a result of the calculation by the calculation unit shows that the playing end time is earlier than the program end time when the stored moving picture data is played at the playing speed designated by the designation unit.

2. The apparatus according to claim 1, wherein the designation unit designates the playing speed at a state of displaying the program table data, and the generation unit updates the delay state of the predetermined channel while displaying the program table data.

3. A moving picture recording and playing method capable of storing, in a store unit capable of storing moving picture data, moving picture data of a program being broadcasted through a channel of a broadcast wave, and capable of playing the stored moving picture data with a delay of a desired time period, said method comprising steps of:

storing, in the store unit, moving picture data of a program being broadcasted on a predetermined channel selected from a plurality of channels according to a user's designation;

playing the moving picture data of a program stored in the store unit;

designating a playing speed of the moving picture data being played by the playing step;

calculating a playing end time of the moving picture data, and a difference between the playing end time and a program end time in an original broadcasting of the program being stored in the store unit as a delay time, based on the playing speed designated by the designating step, the calculating step including judging whether playing the program corresponding to the stored moving picture data by the playing step is currently paused, thereby switching over a calculation method of the delay time in accordance with a judgment result; and generating a program table data formed from a plurality of program information including programs at least being broadcasting based on program information data received through the broadcast wave, wherein the generating step includes generating a program table data indicating that the broadcasting time of a program to be broadcasted on the predetermined channel is delayed by the delay time, and updating the generated program table data in accordance with the play speed of the program being changed by the designating step, so as to indicate an updated delaying state in which the program to be broadcasted on the predetermined channel is delayed by the delay time calculated in the calculating step based on the changed playing speed, wherein the program table data being the program information of the predetermined channel and program information of the other channels are arranged in parallel with regard to the present time as a standard, and wherein the generating step further includes generating an error display for indicating that the playing end time cannot be advanced, to cause a display unit to display the generated error display, if a result of the calculation in the calculating step shows that the playing end time is earlier than the program end time when the stored moving picture data is played at the playing speed designated by the designating step.

4. The method according to claim 3, wherein, during the designating step, the playing speed at a state of displaying the program table data is designated, and, during the generating step, the delay state of the predetermined channel while displaying the program table data is updated.

* * * * *